Jan. 13, 1959    R. L. HENRY    2,868,993

APPARATUS FOR REPRODUCING A PATTERN OUTLINE

Filed Aug. 7, 1953    12 Sheets-Sheet 1

INVENTOR.
ROBERT L. HENRY

BY
DES JARDINS, ROBINSON & KEISER
Howard T. Keiser
HIS ATTORNEYS

INVENTOR.
ROBERT L. HENRY
BY
DES JARDINS, ROBINSON & KEISER
Howard T. Keiser
HIS ATTORNEYS Jan. 13, 1959 R. L. HENRY 2,868,993

APPARATUS FOR REPRODUCING A PATTERN OUTLINE

Filed Aug. 7, 1953

12 Sheets-Sheet 3

INVENTOR.
ROBERT L. HENRY

BY
DES JARDINS, ROBINSON & KEISER
Howard J. Keiser
HIS ATTORNEYS

INVENTOR.
ROBERT L. HENRY
BY
DES JARDINS, ROBINSON & KEISER
Howard J Keiser
HIS ATTORNEYS Jan. 13, 1959 R. L. HENRY 2,868,993

APPARATUS FOR REPRODUCING A PATTERN OUTLINE

Filed Aug. 7, 1953 12 Sheets-Sheet 5

INVENTOR.
ROBERT L. HENRY

BY
DES JARDINS, ROBINSON & KEISER
Howard T. Keiser
HIS ATTORNEYS

INVENTOR.
ROBERT L. HENRY
BY
DES JARDINS, ROBINSON & KEISER
Howard Keiser
HIS ATTORNEYS INVENTOR.
ROBERT L. HENRY
BY
DES JARDINS, ROBINSON & KEISER
Howard D. Keiser
HIS ATTORNEYS Jan. 13, 1959 R. L. HENRY 2,868,993

APPARATUS FOR REPRODUCING A PATTERN OUTLINE

Filed Aug. 7, 1953

12 Sheets-Sheet 8

INVENTOR.
ROBERT L. HENRY
BY
DES JARDINS, ROBINSON & KEISER
Howard D. Keiser
HIS ATTORNEYS

APPARATUS FOR REPRODUCING A PATTERN OUTLINE

Filed Aug. 7, 1953

INVENTOR.
ROBERT L. HENRY

BY
DES JARDINS, ROBINSON & KEISER
Howard T. Keiser
HIS ATTORNEYS

Jan. 13, 1959 R. L. HENRY 2,868,993

APPARATUS FOR REPRODUCING A PATTERN OUTLINE

Filed Aug. 7, 1953 12 Sheets-Sheet 10

INVENTOR.
ROBERT L. HENRY
BY
DES JARDINS, ROBINSON & KEISER
Howard T. Keiser
HIS ATTORNEYS

INVENTOR.
ROBERT L. HENRY

BY
DES JARDINS, ROBINSON & KEISER
Howard D. Keiser
HIS ATTORNEYS

Jan. 13, 1959 R. L. HENRY 2,868,993

APPARATUS FOR REPRODUCING A PATTERN OUTLINE

Filed Aug. 7, 1953 12 Sheets-Sheet 12

INVENTOR.
ROBERT L. HENRY

BY
DES JARDINS, ROBINSON & KEISER
Howard S. Keiser
HIS ATTORNEYS

Patented Jan. 13, 1959

2,868,993

APPARATUS FOR REPRODUCING A PATTERN OUTLINE

Robert L. Henry, Cincinnati, Ohio, assignor to The Cincinnati Milling Machine Co., Cincinnati, Ohio, a corporation of Ohio Application August 7, 1953, Serial No. 372,827

31 Claims. (Cl. 250—202)

This invention relates to a method of and apparatus for automatically causing a machine tool to reproduce a shape represented by a pattern line.

There has been a constantly increasing demand of recent years, particularly in the automobile and aircraft industries, for a contouring machine which is capable of following a line on a pattern or drawing and reproducing the shape of the line on a metal workpiece. The best known machine in use today for reproducing intricate shapes is a machine known as the automatic profiler. This device is basically a milling machine in which a tracer element is caused to automatically follow the edge of a pattern and thereby control the movement of the cutter relative to the work. The tracer element is maintained in contact with the edge of the pattern as it moves therealong by a control mechanism which operates in response to the deflection of the element by the edge of the pattern. This type of machine is handicapped by the fact that it requires the use of accurately shaped patterns, known to the trade as "masters," which are expensive and require considerable time to make.

Accordingly, it is an object of the present invention to provide automatic means to reproduce a given shape or outline directly from a line on a drawing or other similar form of pattern.

Another object of the invention is to provide a reproducing method and apparatus which will enable a shape represented by a pattern line to be rapidly and accurately reproduced.

Another object of this invention is to provide a novel method of scanning a pattern line to obtain phased electrical impulses from which a control voltage is derived which keeps the machine on the line and causes the cutter to reproduce the shape of the pattern line on the workpiece.

Another object of the invention is to provide a novel form of scanning head for a line following device.

Another object is to provide a scanning head in which a cathode ray tube is utilized to produce an oscillatory beam for scanning laterally back and forth across the pattern line.

Another object is to provide a novel means for maintaining the scanning beam properly oriented with respect to the pattern line.

Another object is to provide means for biasing the beam in two directions from the center of the tube and for maintaining the direction of bias properly oriented with respect to the line being followed.

Another object is to provide means whereby the beam may be biased in a lateral direction from its normal, centered position, to compensate for the diameter of the cutter employed in the machine tool, and also biased in a longitudinal direction for introducing anticipation or eccentricity. The biasing means is made adjustable to permit the beam position to be corrected as the diameter of the tool changes due to wear and to permit the amount of anticipation to be varied as desired.

Another object of the invention is to provide a novel means for adjusting the sensitivity of the control exerted by the scanning device on the machine tool being controlled thereby.

Another object is to provide a novel electrical circuit for comparing the phase of the impulses produced by the scanning beam with an alternating voltage source and producing, in accordance therewith, a signal voltage having a sign and magnitude corresponding to the direction and extent of deviation of the center of oscillation of the beam from the line.

Another object is to provide a member displaceable in one direction or another from a center or normal position for controlling the movement of the scanning head in one direction or another transversely of the line, and an element moved in accordance with the movement of the member for canceling out the signal voltage.

Another object is to provide a novel fail-safe control for stopping the machine in case the scanning beam loses contact with the pattern line.

Another object is to provide novel means on the pattern for enabling the line following device to negotiate abrupt turns and sharp corners without any reduction in the rate of travel of the beam along the line.

The method and apparatus which I have devised for the purpose of achieving the foregoing objects and which will hereinafter be described in connection with the drawings in considerable detail, utilizes the principle of sweeping a beam of radiant energy back and forth across a pattern line or drawing line representing the shape which is to be reproduced. Each time the beam crosses the line, this fact is detected by a phototube which produces an electrical impulse each time the light received thereby from the pattern changes in intensity. The phase relationship of these impulses with respect to the cyclical sweep of the beam provides an indication of the direction and extent of deviation of the center of the beam sweep from the line. This phase relationship is utilized to produce a signal voltage having a sign and magnitude corresponding to the direction and extent of deviation of the center of the beam sweep from the line and this voltage is used to control the direction of travel of the beam along the line so as to return the center of the beam sweep onto the line. The cutter of the machine is simultaneously controlled so that it will follow the same path with respect to the workpiece that the scanning head follows with respect to the pattern. Since the frequency of oscillation of the beam back and forth across the line is extremely high, and since the control mechanism of the machine responds almost instantaneously to deviations of the center of the beam sweep from the line, it is possible to control the path followed by the cutter of the machine tool with a high degree of precision even at very high feed rates. With my method and apparatus it is not necessary to reduce the feed rate when traveling around sharp corners since I am able, by suitable modification of the pattern line, to maneuver the tool around the corner by means of a curved path which is easily followed by the device. This path is produced by appending to the pattern line, in the vicinity of the corner, a loop which reverses, or approximately reverses, the direction of travel of the scanning beam.

This accomplishment of the above-stated results by my novel method and apparatus has required, of course, the provision not only of a new method of control, but also a new form of apparatus cooperating in a novel manner with the machine tool controlled thereby. The various important aspects of my invention will be brought out more clearly in the succeeding portions of the specification as well as in the drawings and in the claims appended hereto.

In the drawings, in which like reference numerals refer to like parts throughout the several views:

Fig. 1 is a front elevation of a reproducing machine in which my invention is shown incorporated.

Fig. 1*a* is a cross-sectional elevation taken through the lower end of the lens tube of the tracing head.

Figs. 12*a*–12*d* are diagrammatic views illustrating the phase relationship of the A and B pulses and of the alternating voltages derived therefrom when the trace is centered on the line.

Figure 13A:
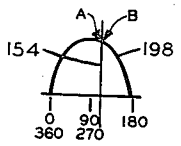
Figure 13B:
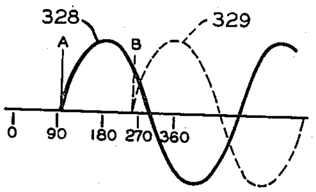
Figure 13C:
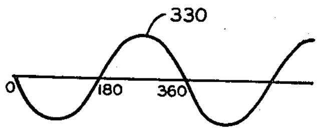

Figs. 13*a*–13*c* are diagrammatic views showing the phase relationship of the pulses and of the voltages derived therefrom when the center of the trace is slightly to the left of the line.

Figs. 14*a*–14*d* are diagrammatic views showing the phase relationship of the pulses and voltages when the center of the trace is a considerable distance to the left of the pattern line.

Figure 15A:
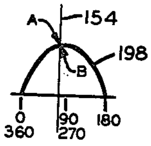
Figure 15B:
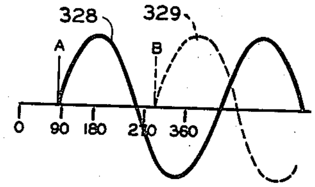
Figure 15C:
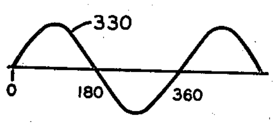

Figs. 15*a*–15*c* are diagrammatic views illustrating the phase relationship between the pulses and voltages when the center of the trace is slightly to the right of the pattern line.

Figs. 16*a*–16*d* are diagrammatic views illustrating the phase relationship between the pulses and voltages when the center of the trace is a considerable distance to the right of the pattern line.

Figure 17:
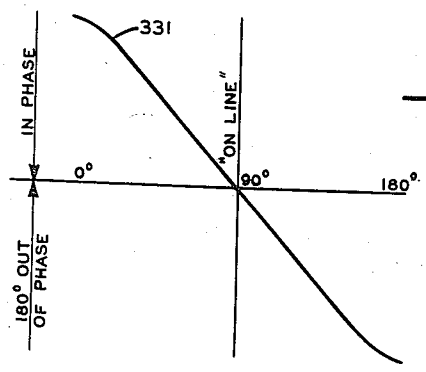

Fig. 17 is a graph illustrating the manner in which the resultant voltage derived from the pulses varies in amplitude and phase with deviations of the center of the trace from the pattern line.

Figure 18:
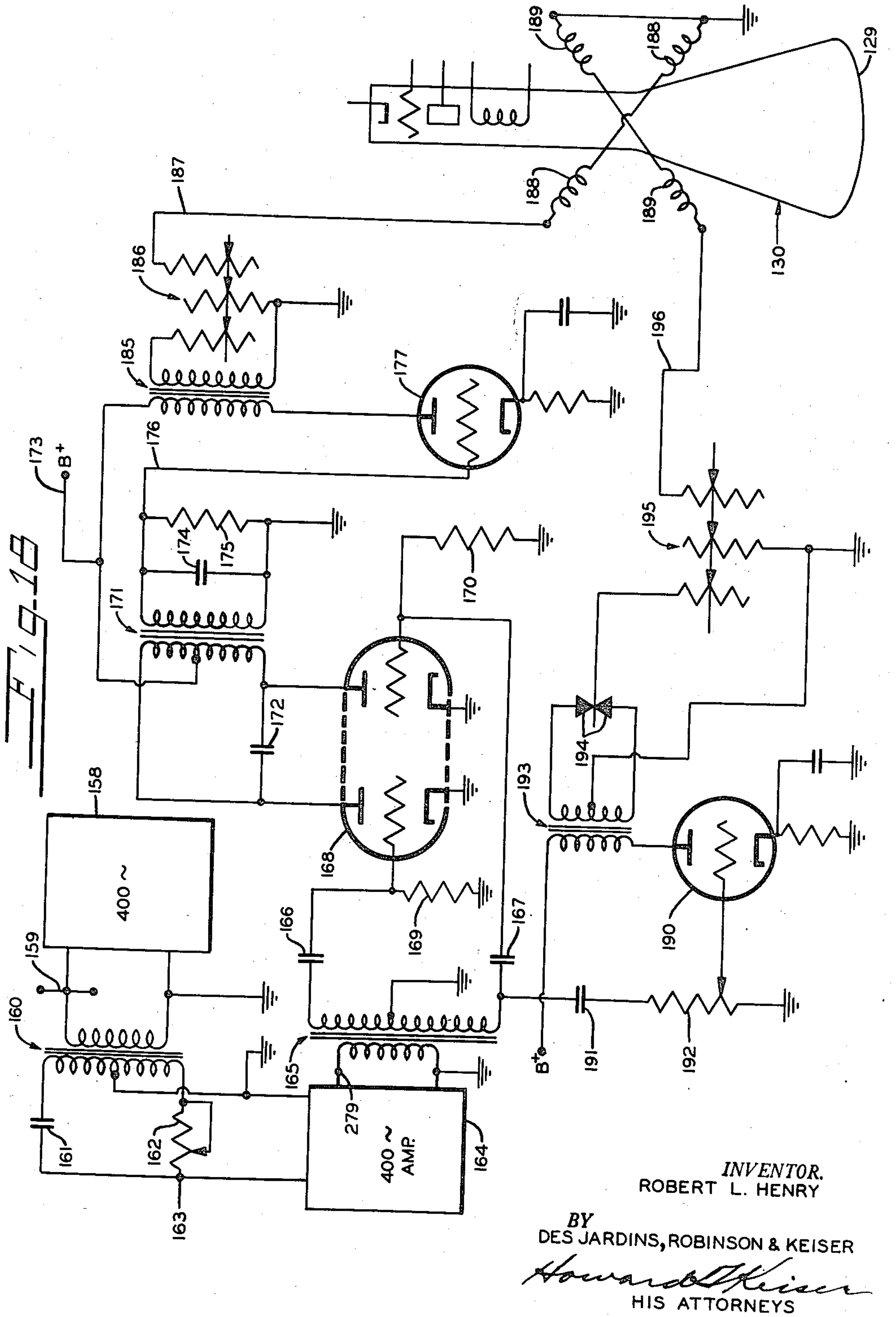

Fig. 18 is an electrical diagram showing the sweep circuits for the cathode ray tube.

Figure 19:
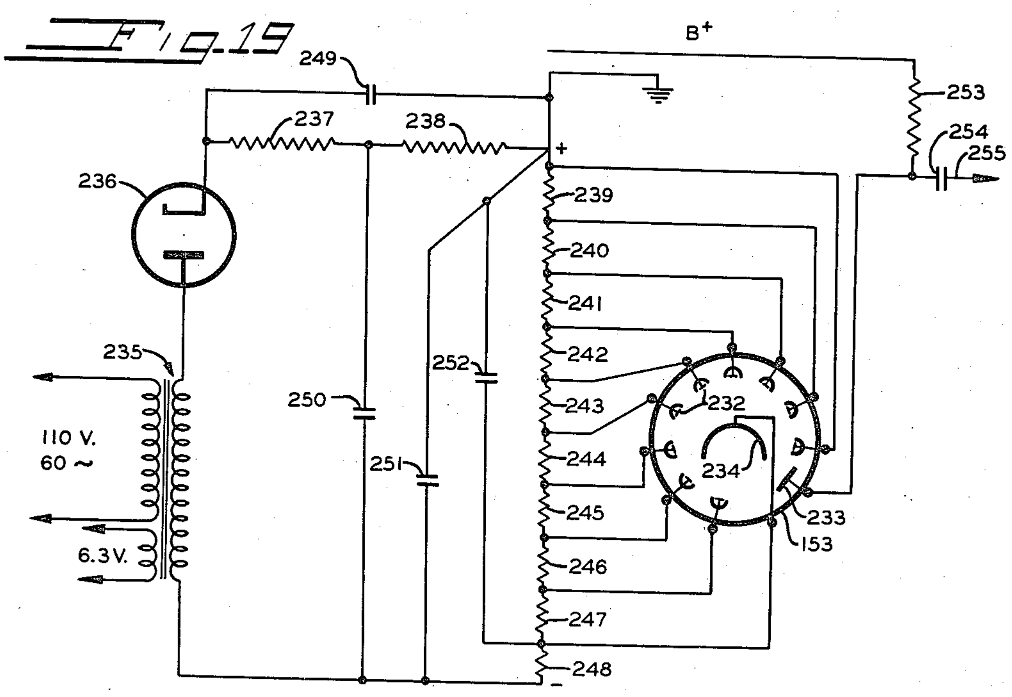

Fig. 19 is a diagram showing the electrical connections to the phototube and the power supply therefor.

Figure 20:
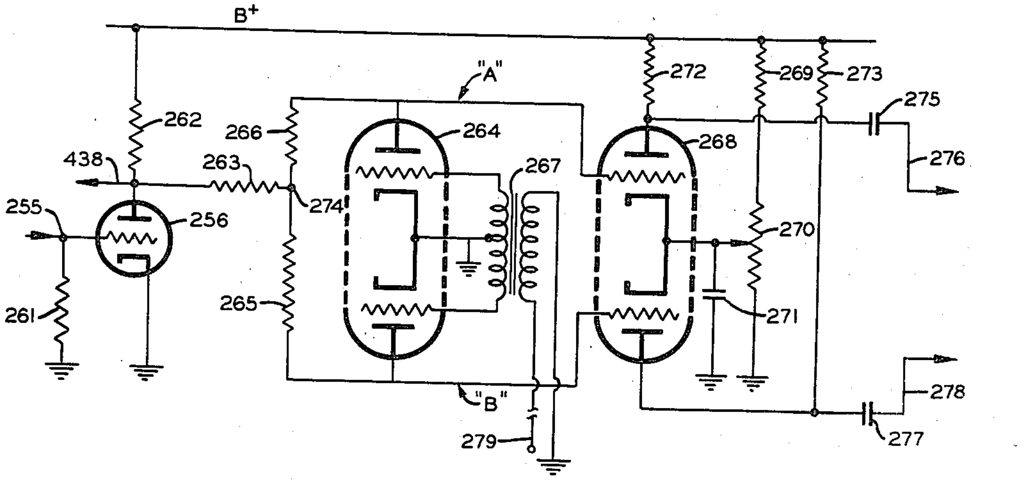

Fig. 20 is an electrical diagram showing the circuit for separating the A pulses from the B pulses.

Figure 21:
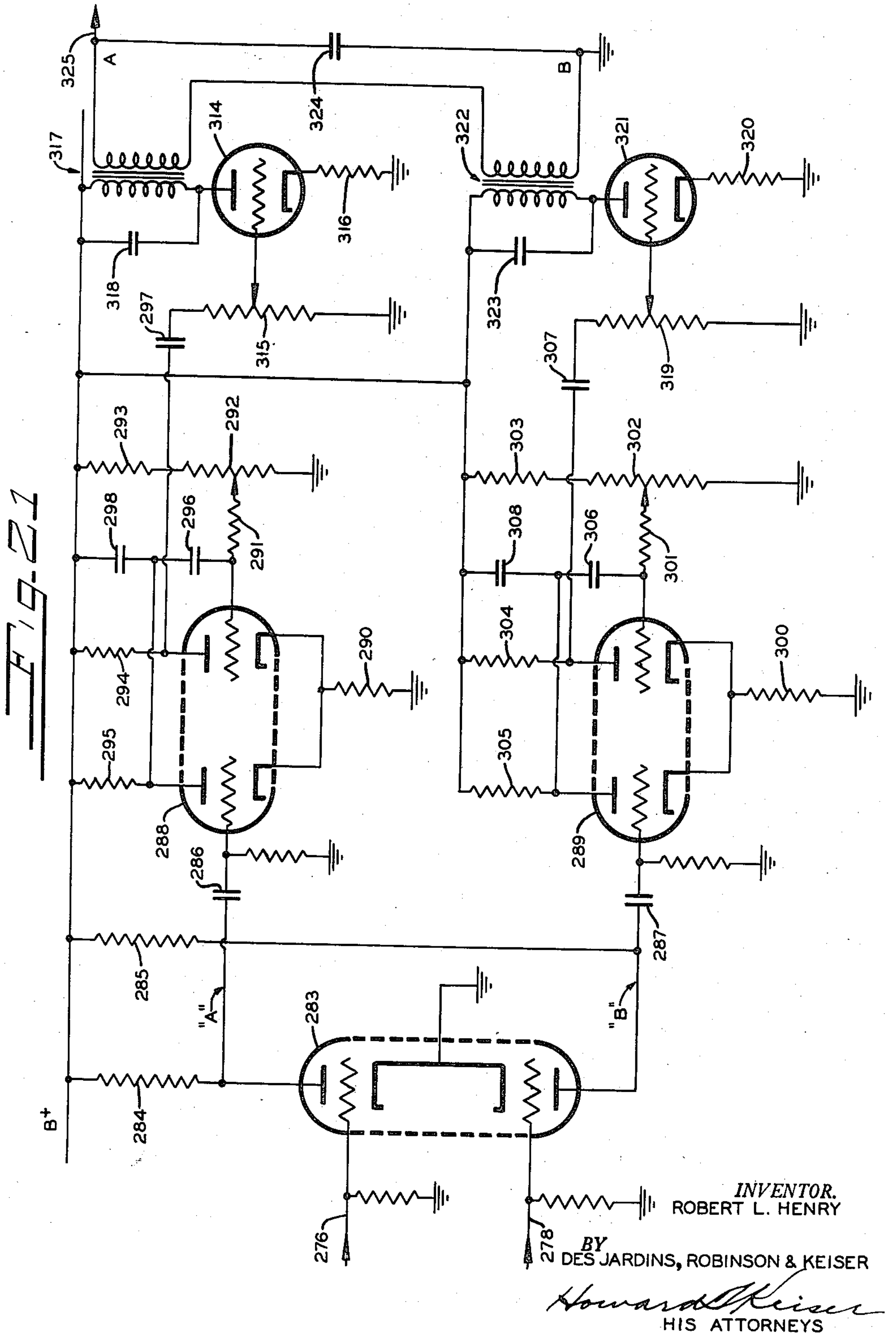

Fig. 21 is an electrical diagram showing the circuits for prolonging the pulses and shaping them into sine wave voltages.

Figure 22:
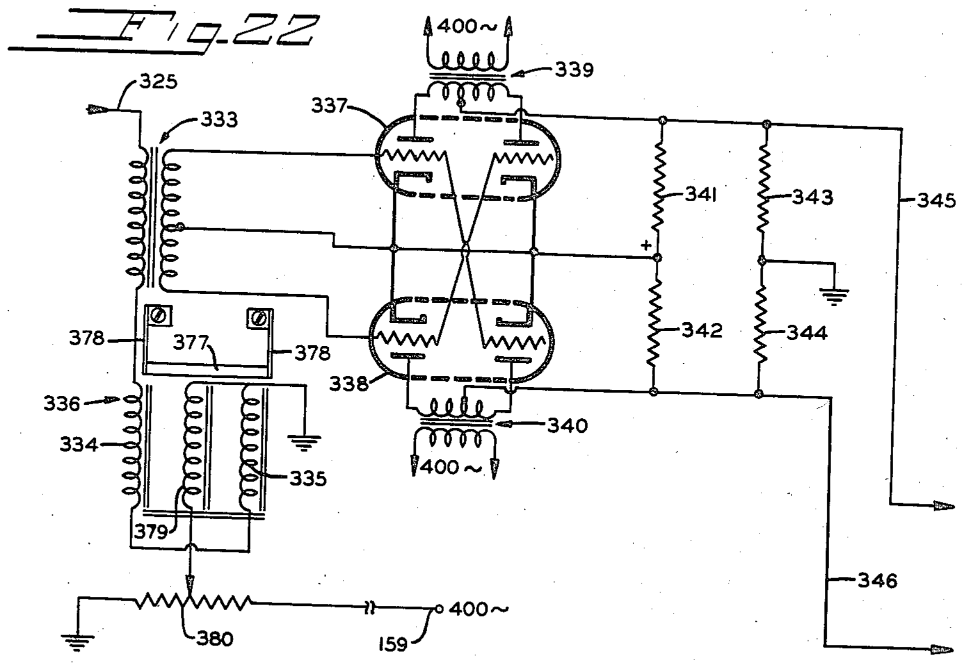

Fig. 22 is an electrical diagram showing the phase sensitive rectifier circuit and the connections to the variable differential transformer.

Figure 23:
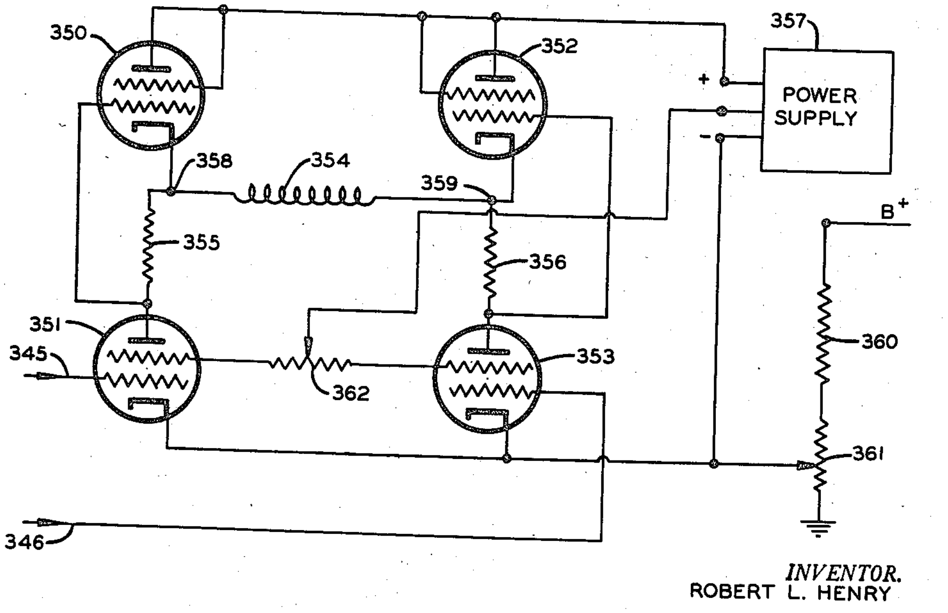

Fig. 23 is an electrical diagram showing the bridge power amplifier circuit.

Figure 24:
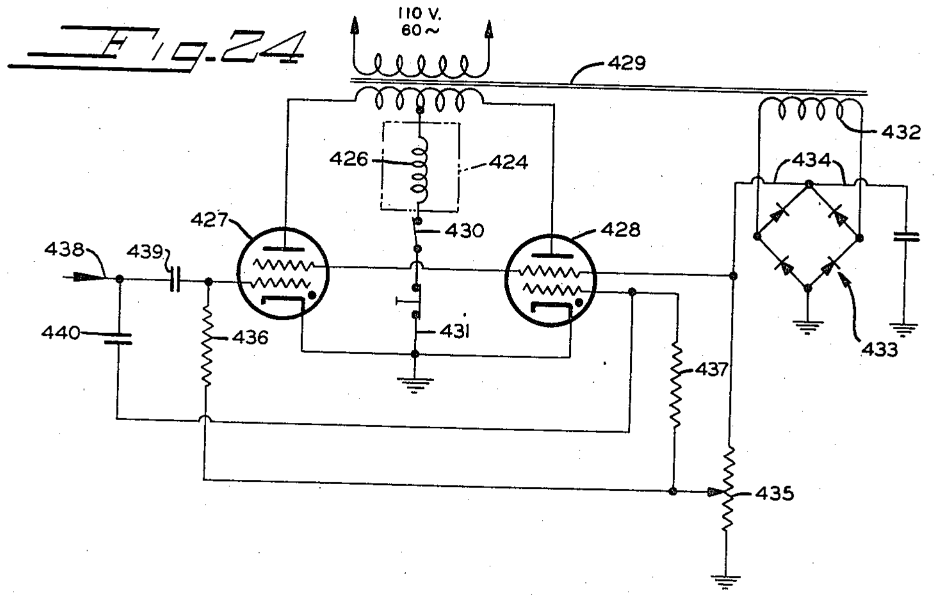

Fig. 24 is an electrical diagram showing the electrical control circuits for the safety cut-out valve.

Figure 25:
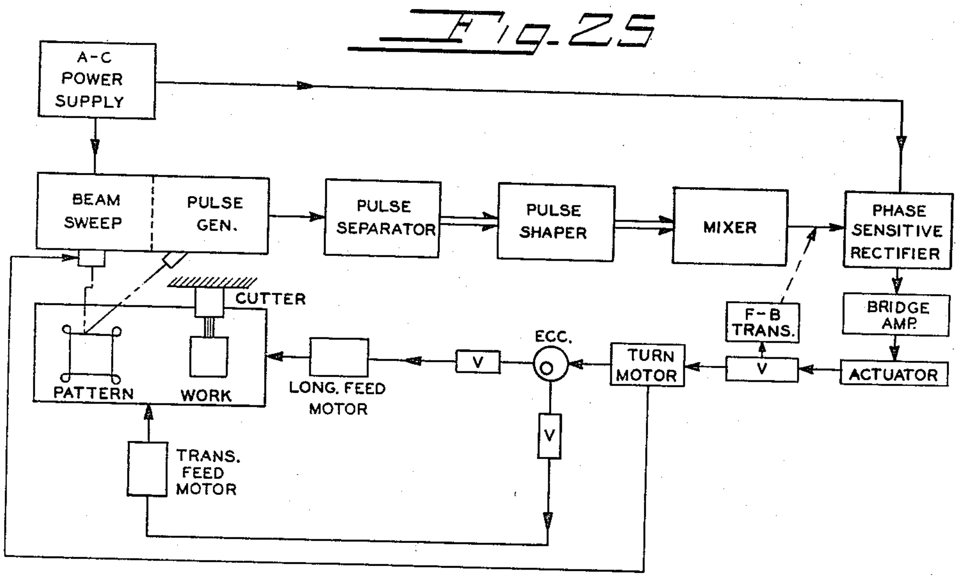

Fig. 25 is a diagrammatic view illustrating the method which I employ to reproduce the pattern outline on a workpiece.

Figures 1, 1A:
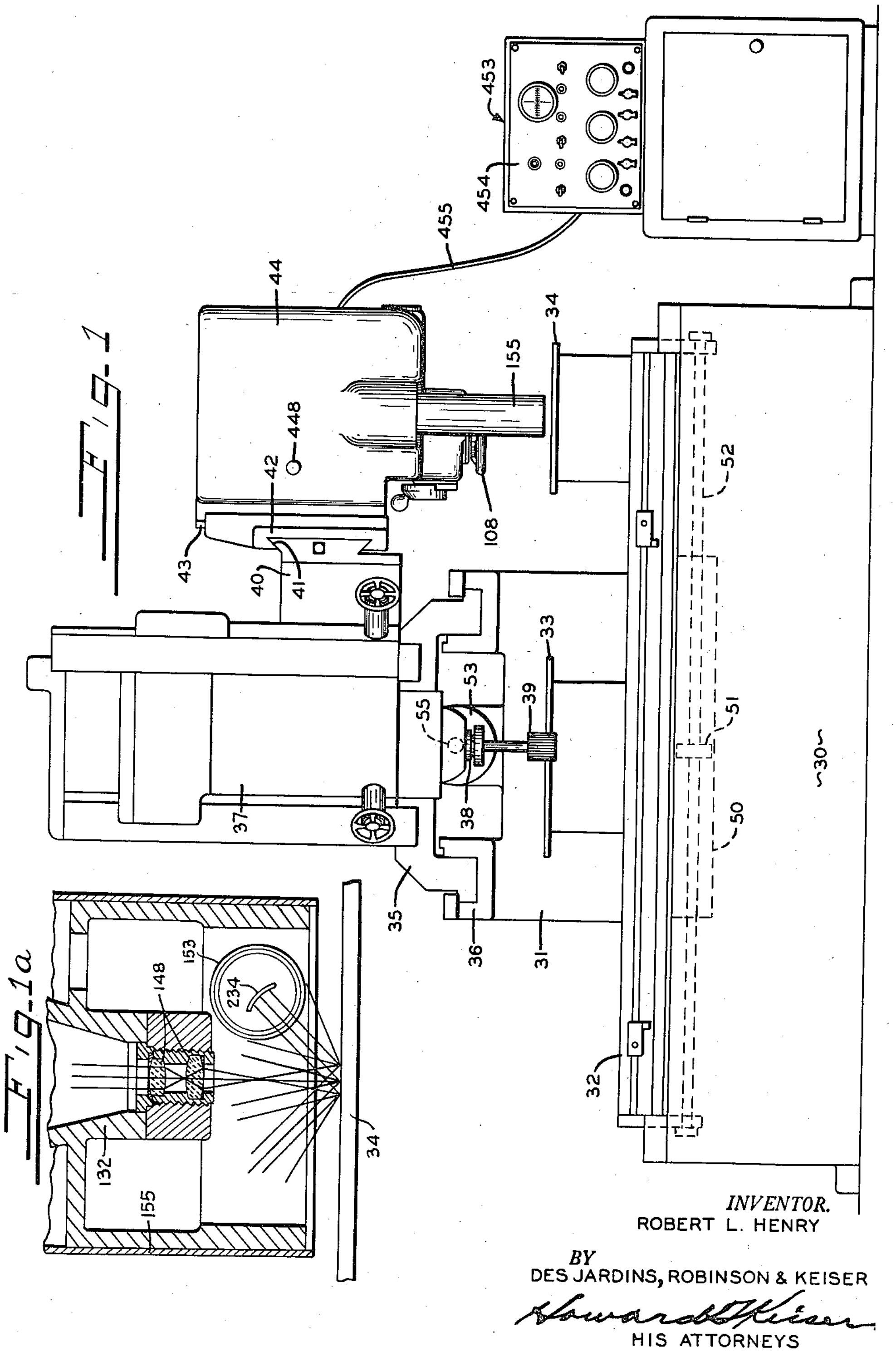
Figure 2:
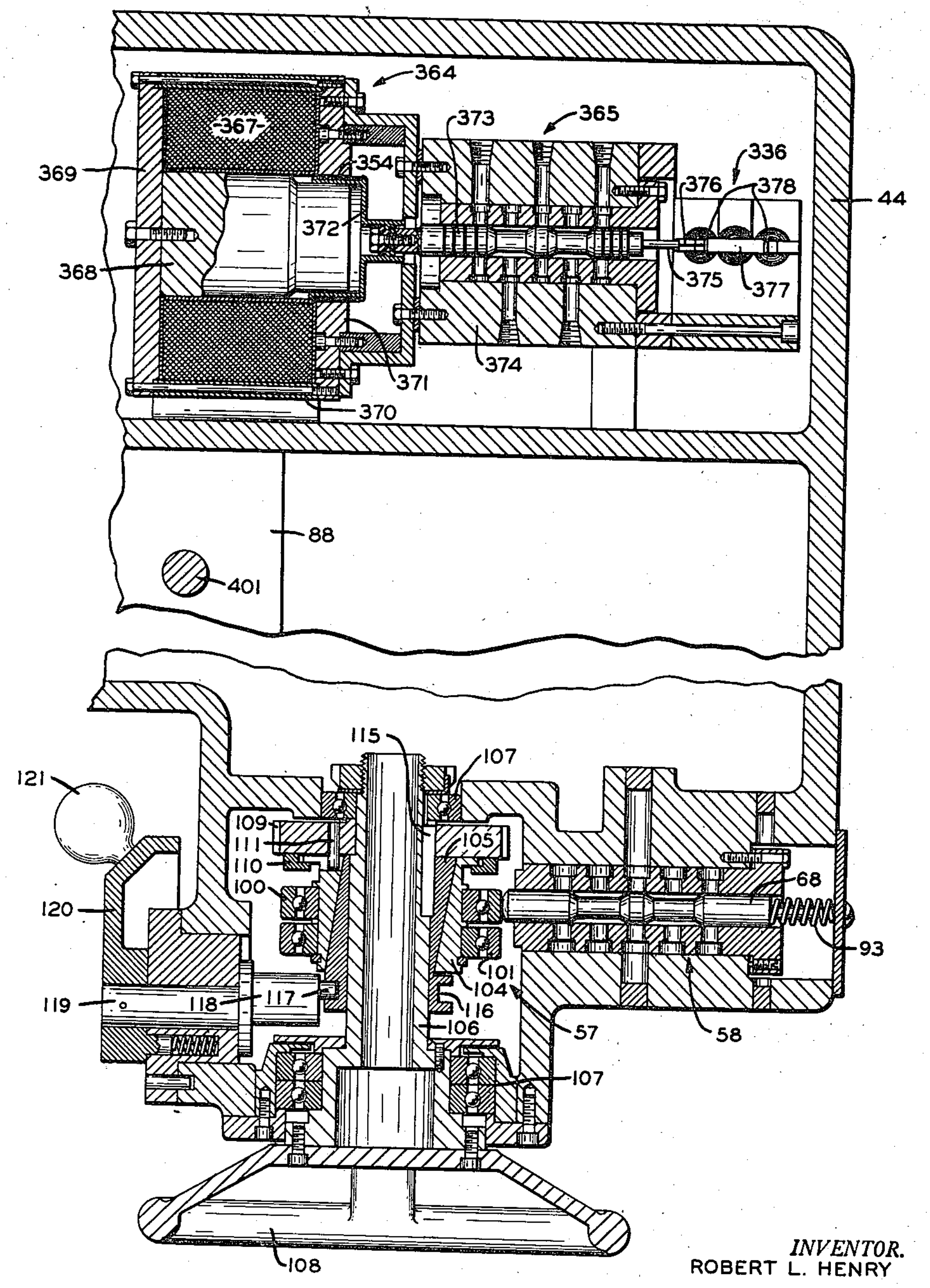
Fig. 2 is a vertical section through the tracer head of the machine shown in Fig. 1.
Figure 3:
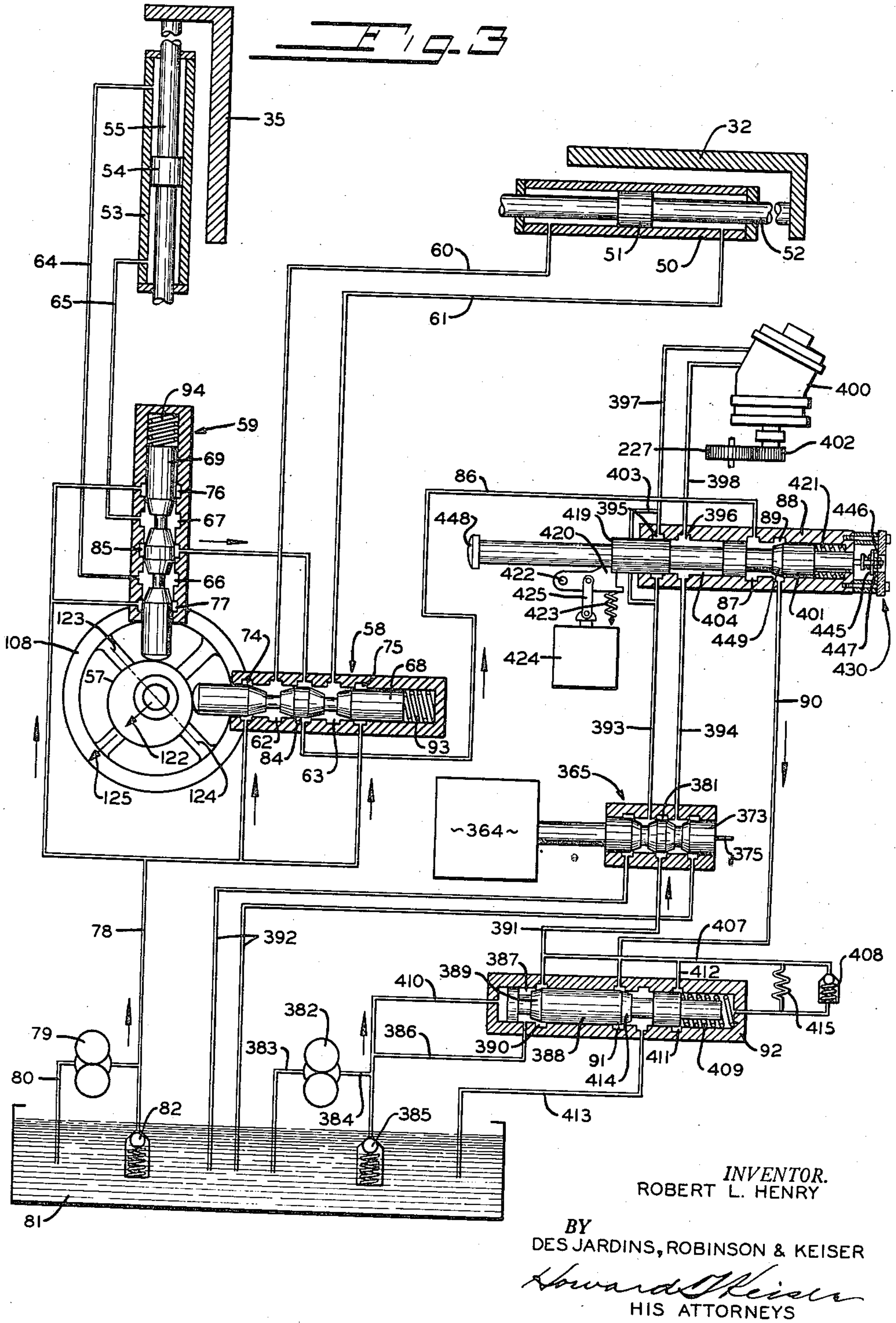
Fig. 3 is a diagrammatic view illustrating the hydraulic circuits incorporated in the machine shown in Fig. 1.

The invention is shown herein as applied to a hydraulically operated milling machine, the general construction of which is shown in Figs. 1 to 3, inclusive. However, it will become apparent from a careful study of the following description of my novel control method and apparatus that the same could be applied to other forms of machine tools with equal facility.

METHOD

The present invention includes the use of a novel method for causing a radiant energy type scanning device to follow a line on a pattern and cause a machine tool to reproduce the outline represented by this pattern line. This method is diagrammatically illustrated in Fig. 25 and, as there shown, includes the steps of sweeping a beam of radiant energy back and forth across a pattern line to thereby produce electrical pulses each time the beam crosses the line. The beam is swept back and forth across the line in exact synchronism with an alternating voltage supply so that the location of the pattern line with respect to the center of the beam sweep will be indicated by the time in the supply voltage cycle when the pulse occurs. The pulses produced on the forward sweep of the beam are then separated from those produced on the return sweep to produce two chains of pulses. The pulses of each chain are then prolonged and shaped into sine-wave voltages which are mixed to provide a resultant voltage which is either substantially in phase with the supply voltage if the center of the beam sweep is to one side of the pattern line, or substantially 180° out of phase therewith if the center of the sweep is on the other side of the pattern line. If the center of the sweep is directly on the pattern line, the resultant voltage will be of zero amplitude since the two sine-wave voltages derived from the pulses will be of equal amplitude and of opposite phase and so will cancel one another. The resultant voltage, if any, is then compared as to phase with the supply voltage to produce a unidirectional signal voltage having a sign and magnitude corresponding to the direction and extent of deviation of the center of the sweep from the pattern line. After being amplified, this signal voltage controls the operation of a valve which in turn controls steering of the machine tool so as to bring the center of the beam sweep back onto the pattern line. As the valve moves, it causes a feedback voltage to be produced which tends to neutralize the signal voltage and prevent hunting. At the same time, the direction of sweep of the beam is adjusted to maintain it at right angles to the pattern line. If the beam is provided with a small amount of eccentricity, this adjustment will tend to move the center of the beam sweep back on the line and thus wash out the signal voltage. Hence, by use of my method, a small deviation of the center of the beam sweep from the pattern line will cause an appreciable signal voltage to be produced which acts at once upon the machine feed mechanism to restore the center of the beam sweep onto the line. Therefore, my novel method is one which affords a high degree of sensitivity while at the same time being productive of smooth control of the machine tool feed mechanism due to the introduction of feedback into the system as noted above.

APPARATUS

The machine illustrated in Figs. 1 to 3, inclusive, is provided with a bed 30 on which is supported a column 31. A work support or table 32 is mounted for endwise sliding movement on top of the bed 30 by means of suitable guideways provided thereon. A piece of work 33 which is to be profiled is secured to the top of the table by any suitable means. In a like manner, a drawing or pattern 34 containing the line representing the shape of the article to be reproduced is also secured to the top of the table in a location where it will lie beneath the tracing head of the machine. A cross-slide or tool support 35 is mounted on the column 31 by guideways 36 for transverse sliding movement with respect to the table. A tool carrier 37 is mounted for vertical sliding movement on the front face of the support 35.

This tool carrier supports a power driven spindle 38 which has mounted on its lower end a rotary cutting tool 39. The carrier 37 has a laterally extending bracket 40 which is provided with a dovetail guideway 41 on which a saddle 42 is mounted for horizontal sliding movement. The saddle 42 is in turn provided with a vertical guideway for receiving the ways 43 formed on a tracing head 44. Also, by means not shown, the spacing between the head 44 and the tool carrier may be adjusted as desired so that by virtue of these various adjustments, the position of the head 44 relative to the cutter 39 may be made to correspond to the relative positioning of the work 33 and the pattern 34.

The table 32 is operated in its feeding movements back and forth along the bed 30 by a hydraulic actuator which includes a cylinder 50 suitably affixed to the bed of the machine and a piston 51 working within the cylinder. This piston is connected by a piston rod 52 with opposite ends of the table 32. In a like manner, the tool support 35 is operated back and forth along the guideways 36 by a hydraulic actuator which includes a cylinder 53, a piston 54 (see Fig. 3), and a piston rod 55 which connects the piston with the support 35.

It will be observed that the milling machine shown herein is provided with a table or work support which is movable in one direction, and with a cross-slide or tool support which is movable in a direction at right angles thereto. Hence, 360° relative movement between the work and cutting tool may be effected by suitably controlling the rate and direction of feed of the table and support simultaneously. The same result could, of course, be achieved by an arrangement in which the cutter is maintained stationary with respect to the frame of the machine while the work is supported on a cross-slide which is mounted for transverse movement upon a sliding work support or table. Whatever arrangement is used, it is convenient to control the rate and direction of feed of the table and cross-slide simultaneously by an eccentric control device such as that illustrated in Fig. 3. In this type of device, there is provided an eccentric 57 whose position at any instant determines the direction of relative movement between the cutter and the work. As the eccentric is turned, the positions of the plungers of a pair of sine and cosine valves 58 and 59 is changed. This effects a change in the rate and also, possibly, a change in the direction of feed of the table 32, and likewise the tool support 35, these elements being indicated diagrammatically in Fig. 3.

The hydraulic circuit shown in Fig. 3 is similar in many respects with the one shown in U. S. Patent No. 2,332,533 granted October 26, 1943, on an application filed by Erwin G. Roehm. Reference may therefore be had to the Roehm patent for those details of construction which are omitted herein.

In the machine presently being described, the operating cylinder 50 for the work support 32 is controlled by the valve 58. The operating cylinder for the tool support is controlled by the valve 59. As shown in Fig. 3, the opposite ends of the cylinder 50 are connected by fluid transmission lines 60 and 61 to ports 62 and 63, respectively, of the control valve 58. In a like manner, the opposite ends of the cylinder 53 are connected by fluid transmission lines 64 and 65 to ports 66 and 67, respectively, of the control valve 59. The valves 58 and 59 are fitted with slidable plungers 68 and 69, respectively, which are actuated by the eccentric 57 to control the flow of fluid between the various ports of the valves. The valve 58 has two pressure ports 74 and 75, and the valve 59 has two pressure ports 76 and 77. All four of these ports are connected to a common pressure supply line 78, which is connected to the pressure side of a pump 79. This pump has a suction line 80 extending into a reservoir 81 and a relief valve 82 which maintains constant pressure in the supply line 78.

The control valves 58 and 59 are provided with exhaust ports 84 and 85, respectively, these ports being connected by a common return line 86 with a port 87 on a safety cut-off valve 88. The function of the valve 88 will be fully described in a later portion of the description, it being necessary at this time only to understand that the valve is normally in the position shown in Fig. 3 in which port 87 is communicatively connected with port 89 on the valve. The latter port is connected by a line 90 with a port 91 on a blocker valve 92. This valve functions to throttle the flow of return fluid when the speed of rotation of the eccentric 57 becomes too great. Thus, the blocker valve will build up back pressure in the cylinders 50 and 53 and thereby reduce the rate of feed of the cutter with respect to the work whenever the pattern calls for a sudden change in the direction of the cutter relative to the work.

Movement of the supports 32 and 35 in one direction or the other is thus controlled by the movement of the plungers 68 and 69 of the control valves in one direction or the other from a centered or neutral position. Likewise, the rate of movement of the supports in either direction is dependent on the extent of movement of the valve plungers. It is also to be noted that even with the plungers centered, the valves are never fully closed so that there is always some pressure in each end of the cylinder controlled thereby and it is always under the control of the valve. Hence, it is the difference in pressure on opposite sides of the pistons 51 and 54 which determines the rate of movement of the supports 32 and 35. Springs 93 and 94 are provided in valves 58 and 59 for always maintaining the ends of the plungers of the valves in contact with the peripheral face of the eccentric 57.

The constructional details of the eccentric itself are shown in Fig. 2 which is a vertical, cross-sectional view taken through the center of the tracer head spindle. As herein shown, the eccentric is comprised of two cams 100 and 101 which are formed by the peripheral faces of a pair of ball races. The plungers 68 of the control valve 58 engages against the upper cam 100, while the plunger 69 of the control valve 59 (not visible in Fig. 2) engages against the lower cam 101. While two separate ball races have been shown for the respective valve plungers, it is to be realized, of course, that a single, wide race could be used for both plungers if this should be found desirable.

The inner ball races of the cams are mounted on an eccentric sleeve 104, which is in the form of a cylinder having a bore which is inclined at a predetermined angle with respect to the axis of the cylinder. The sleeve 104 is supported on a second eccentric sleeve 105 whose outside diameter is approximately equal to the diameter of the bore of the first sleeve 104. The sleeve 105, like the sleeve 104, is in the form of a cylinder having a bore which is inclined at a predetermined angle with respect to the axis thereof, this angle in the case of the second sleeve being the same as in the case of the first sleeve but in the opposite direction. Hence, the axis of the bore of the second sleeve will coincide with the axis of the cylinder forming the first sleeve when the sleeves are fully meshed as shown in Fig. 2. By means of this construction there is provided a mechanism whereby the eccentricity of the cams may be adjusted at will from zero eccentricity, when the sleeves are fully meshed, to maximum eccentricity when the sleeves are slid apart or unmeshed to the maximum extent permissible.

The second eccentric sleeve 105 is slidably supported on a hollow spindle 106 which is supported for rotation in the tracer head by means of anti-friction bearings 107. A hand wheel 108 is bolted to the lower end of the spindle so that it may be manually rotated by the operator of the machine should the need arise for hand steering of the machine. Fast on the upper end of the spindle is a gear 109 by means of which the spindle may be rotated by a power operated device which is controlled by my novel line tracing apparatus. The outer sleeve 104 is connected to this gear for rotation therewith while at the same time being free to move relative thereto in a radial direction. This connection is effected by a retaining ring 110 having a flange which underlies a flange formed on the upper end of the sleeve so that relative movement radially of the sleeve and gear is permitted while relative movement of these parts in the axial direction is prevented. The gear carries a drive pin 111 which engages in a radial slot formed in the upper end of the sleeve so as to cause the sleeve to rotate with the gear.

A key 115 which is received in a keyway formed in the spindle 106 engages with the gear 109 and prevents it from rotating on the spindle. The same key cooperates with a keyway formed in the inner sleeve 105 and prevents rotation of this sleeve relative to the spindle while permitting the sleeve to slide therealong. By means of these connections, the gear 109 is able to rotate the spindle and sleeves as a unit.

To enable the inner sleeve 105 to be adjusted up or down on the spindle, an annular groove 116 is formed on the lower end of the sleeve for receiving a shifting pin 117 formed on the end of a crank pin 118 which is carried by a shaft 119 journaled in the framework of the head. Secured to the shaft 119 is a graduated dial 120 which carries a handknob 121 by means of which the shaft may be turned and the inner sleeve adjusted up and down on the spindle.

As mentioned earlier herein, when the inner sleeve is in its uppermost or fully nested position, as shown in Fig. 2, the cams are rendered concentric with respect to the axis of the spindle and the plungers of the control valves 58 and 59 will be centered so that the supports 32 and 35 will remain at rest. However, as the inner sleeve 105 is moved downward as the result of adjustment of the handknob 121, the outer sleeve will be shifted laterally with respect to the spindle to thereby render the cams eccentric with respect to the axis of the spindle. This will cause the positions of the valve plungers to be readjusted with consequent feeding movement of the tool and work supports. The rate of feed will be dependent upon the degree of eccentricity imparted to the cams, while the direction of movement of the work relative to the cutter will correspond to the orientation of the maximum radius of eccentricity of the cams. This direction of maximum eccentricity, which is indicated by reference numeral 122 in Fig. 3, always remains fixed with relation to the spindle 106 so that the rotational position of the spindle always determines the direction of movement of the cutter relative to the work.

While the length of the radius of the cams in the direction of maximum eccentricity will vary with the setting of the dial 120, the length of the radii 123 and 124 (Fig. 3) lying at right angles thereto always remains the same i. e., equal to the radius of the cams at zero eccentricity. Therefore, whenever one or the other of these radii is aligned with the axis of the plunger of either of the valves 58 or 59, that valve will be centered and no movement of the support controlled thereby will take place. These radii mark the crossover point for the valves, that is, the point at which they reverse the direction of movement of their related supports.

With the cams in the position shown in Fig. 3, the valve plunger 68 is to the left of its neutral position while the valve plunger 69 is below its neutral position. This is so because the radii of the cam portions which are in contact with the plungers are shorter than the radii 123 and 124. Accordingly, the pressure port 74 of valve 58 is connected to cylinder port 62, and exhaust port 84 is connected to cylinder port 63 so that table 32 will be moved to the right. In the case of valve 59, the pressure port 77 is connected to cylinder port 66, and exhaust port 85 is connected to cylinder port 67 so that the slide 35 will move downwardly in Fig. 3. The resultant movement of the cutter relative to the work is in the direction of the arrow 122 in Fig. 3.

If, now the cams are rotated clockwise as viewed in Fig. 3, the valve plunger 69 will be moved upward toward its neutral position thereby reducing the rate of feed of the slide 35. At the same time, the plunger 68 will be moved to the left, thereby increasing the speed of movement of table 32 toward the right. Hence, the direction of movement of the cutter relative to the work will be changed and will now be indicated by the new position assumed by the arrow 122. The rate of feed of the cutter relative to the work will, however, remain the same since the resultant of the movements of the supports 32 and 35 will change in direction only and not in magnitude. The spindle 106 may be rotated either manually by handwheel 108 or automatically by gear 109 from any given position to any other given position and may be turned in either direction, that is, either clockwise or counterclockwise. Whatever the position of the spindle, the direction of movement of the cutter relative to the work will be indicated by the arrow 125 (Fig. 3) which may be conspicuously painted or embossed on the handwheel so as to provide a convenient indication to the operator of the machine of the direction of relative movement of the cutter with respect to the work.

The previously described structure is of a type well known in the profiling machine art and is for the most part, identical with that shown in the earlier mentioned Roehm patent. The structure hereinafter to be described, together with the mode of operation thereof and its relation to the existing structure, constitutes the novel and inventive subject matter of this disclosure.

*Photoelectric scanning device*

Figures 4, 5, 6:
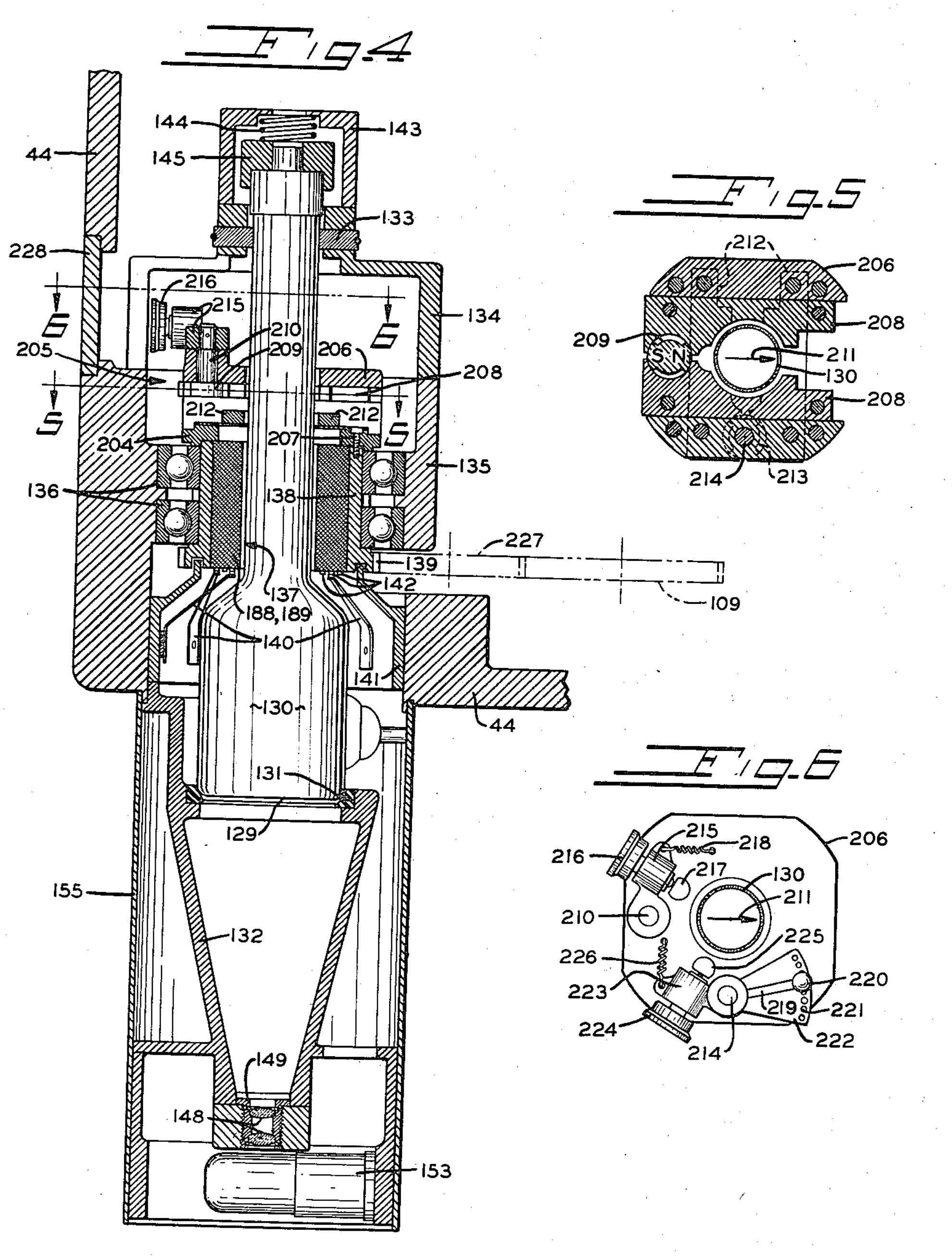
Fig. 4 is a vertical section taken through a portion of the tracer head shown in Figs. 1 and 2, this section being taken at right angles to the section shown in Fig. 1*a*.
Fig. 5 is a section taken along the line 5—5 in Fig. 4.
Fig. 6 is a section taken along the line 6—6 in Fig. 4.

In the present machine, scanning of the drawing or pattern to be reproduced is accomplished photoelectrically by the apparatus shown in Figs. 4, 18 and 19. The scanning is effected by a rapidly oscillating beam of radiant energy which sweeps back and forth across the pattern line and produces a signal each time the beam crosses the line. The time when these signals occur in the periodic sweep of the scanning beam provides an indication of the position of the pattern line with respect to the midpoint of the beam sweep. This information is therafter utilized in a novel manner to control the positioning of the eccentric and, thereby, the steering of the cutter with relation to the work. The rapidly oscillating beam of radiant energy used for scanning the pattern line is produced by a cathode ray tube 130 (Fig. 4) which is mounted in a vertical position on the tracer head 44, with the screen 129 thereof facing down. Use of a cathode ray tube to produce the scanning beam in a photoelectric type of line following device is advantageous since it provides an inertialess means for generating a rapidly oscillating beam of radiant energy. Moreover the beam may be swept across the pattern at speeds which are unattainable by any other method. Also the scanning pattern of the beam may be easily shaped to cause it to follow any desired path, and the sweep of the beam is readily maintained in perfect synchronism with a reference voltage of any desired frequency.

In the present embodiment of the invention, the cathode ray tube 130 is mounted within a housing carried by the tracing head 44 which is supported by the tool support 35. Hence, the cathode ray tube, like the cutter 39, is supported for 360 degree movement with respect to the surface of the work support 32 on which the work and pattern are mounted. The cathode ray tube 130 is supported in position in the housing by a cushioning ring 131 on which the lower end of the tube rests as shown in Fig. 4. The ring 131 is seated in an annular recess formed in the upper end of a lens tube 132 which is supported in the framework of the head 44. At its upper end, the cathode ray tube 130 is steadied by a plurality of aligning plugs 133 formed of plastic, or other suitable resilient material, which bear against the neck of the tube at several points around its periphery so as to yieldingly maintain the tube in a vertical position. The plugs 133 are mounted in a cover 134 which surrounds the upper end of the tube and is in turn supported by a cylindrical casing 135 which is formed intergral with the framework of the tracing head 44. Supported on the casing 135 by means of a pair of ball bearings 136 is a scanning yoke 137 for the cathode ray tube. The coils of the yoke are supported within an annular sleeve 138 which is provided on its lower end with a ring gear 139 so that the yoke may be rotated about the longitudinal axis of the cathode ray tube by means hereinafter to be described. Sweep voltages are applied to the deflection coils of the yoke 137 by brushes 140 carried by an oil shield 141 mounted in the aperture provided in the bottom of the head 44 to accommodate the cathode ray tube 130. The brushes 140 are electrically insulated from the shield 141 and make contact with three slip rings 142 arranged concentrically on the bottom of the yoke 137. Hence, current may be supplied to the deflection coils in any position of the yoke by means of the brushes 140 and slip rings 142. The extreme upper end of the cathode ray tube is enclosed by a cap 143 which is supported on the cover 134. A compression spring 144 acting between the cap 143 and a tube socket 145 resiliently urges the bottom of the tube against the cushioning ring 131. The socket and the connections thereto for providing the drive on the cathode ray tube may be of conventional design.

The trace produced by the electron beam on the screen of the tube is focused on the pattern 34 (Fig. 1*a*) by a suitable lens system 148 mounted in a lens carrier 149 which is adapted to screw into a threaded hole provided in the lower end of the lens tube 132. Light reflected from the pattern, or from the pattern line, will be received by the photo-sensitive cathode of a phototube 153 mounted in a recess provided therefore in the lower end of the lens tube 132 to one side of the optical axis of the lens system 148. The phototube is shielded from extraneous light by a tube 155 surrounding the lens tube 132.

Figure 7:
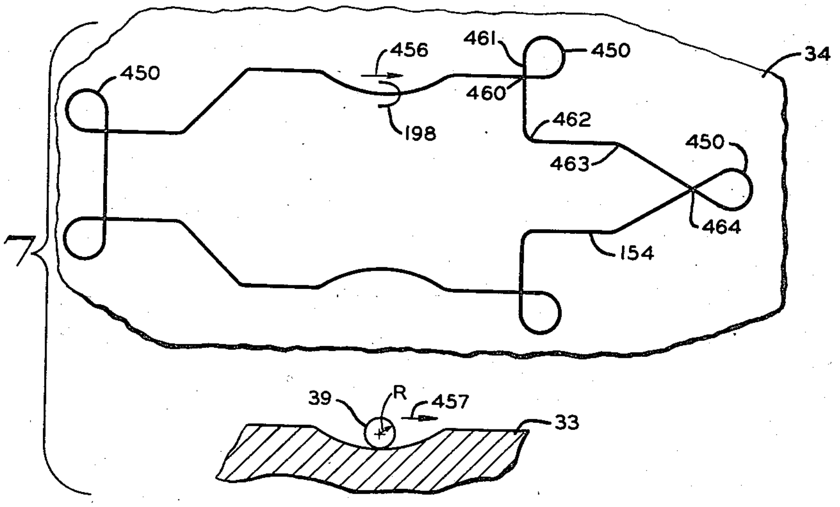
Fig. 7 is a diagrammatic view showing the relation of the pattern, scanning beam, workpiece and cutter.

With the arrangement shown in Fig. 4, as the electron beam of the cathode ray tube is swept back and forth to form a trace on the screen 129, the image of the trace will be projected by the lenses 148 onto the pattern 34. A plan view of a typical pattern containing a pattern line 154 to be traced is illustrated in Fig. 7. In the embodiment of the invention presently being described, it will be understood that the pattern 34 is provided with a dark surface so as to constitute a poor reflector, while the line 154 being followed, is of a light character so as to constitute a better reflector than the background. Hence, each time the moving spot of light projected from the screen of the cathode ray tube crosses the line 154, a pulse of scattered light will strike the cathode of the phototube 153.

*Sweep circuits for cathode ray tube*

As mentioned earlier herein, a rapidly oscillating beam of radiant energy is used for scanning the pattern line. This beam, or rapidly moving spot of light produced by the cathode ray tube 130, is caused to follow a predetermined sweep path by means of the sweep generating circuits shown in Fig. 18. Since it has been found desirable to cause the scanning beam to sweep back and forth across the pattern line at a frequency in the neighborhood of 400 cycles per second, an alternating current generator 158 (Fig. 18) is provided. This generator may be of any desired type so long as it produces a voltage of substantially constant frequency and amplitude. I have found that a Wien-bridge oscillator of conventional design is satisfactory for my purposes and, hence, the generator 158 may be considered to comprise such an oscillator together with a suitable amplifier for providing the power required to drive the various parts of my system which require current therefrom. As shown in Fig. 18, one side of the output of the generator 158 is grounded while the other side is connected to a terminal 159. Connected between the terminal 159 and ground is the primary winding of a transformer 160 which has a center-tapped secondary winding. The center tap of the secondary is grounded while the ends of this winding are connected through a condenser 161 and a variable resistor 162 to an output terminal 163. This constitutes a phase-shifting network the purpose of which will be explained in a subsequent portion of the description. The phase of the voltage at output terminal 163 may be shifted from approximately 0° to 180° with respect to the voltage at the terminal 159 by varying the resistance of the variable resistor 162. Thus, when the resistance of 162 is zero, approximately zero phase shift will be introduced. When it is equal to the reactance of condenser 161, the phase shift will be 90°. When the resistance of 162 is made very large, the phase shift will approach 180°.

The output terminal 163 of the phase-shifting circuit is connected to the input terminal of a power amplifier 164. The output of the amplifier 164 feeds the primary winding of a center-tapped transformer 165 which has a turns ratio that will produce an output of several hundred volts in the secondary. As herein shown, the center tap of the secondary winding is grounded while the ends thereof are connected through condensers 166 and 167 with the grids of a twin triode amplifier tube 168. The tube 168 has heater type cathodes which are connected directly to ground and the two grids are returned to ground through grid resistors 169 and 170. It will be noted that the tube 168 is operated at zero bias in the present circuit and this tube should therefore be of a type which is adapted to operate under zero bias conditions, such as a 6SN7 tube. Each plate of the tube 168 is connected to one of the ends of a center-tapped primary winding of a transformer 171. The plates of the tube are also shunted by a condenser 172 and are supplied with positive voltage through a conductor 173 which is connected with the center tap on the primary winding of transformer 171. The conductor 173 may be connected with any suitable voltage source capable of supplying a plate potential of several hundred volts, the negative terminal of this source being connected to ground in the conventional manner. The secondary winding of the transformer 171 is shunted by a condenser 174 and also by a resistor 175. It is also to be noted that one side of the secondary is grounded while the other side is connected by an output lead 176 with the grid of an amplifier tube 177.

Figure 8:
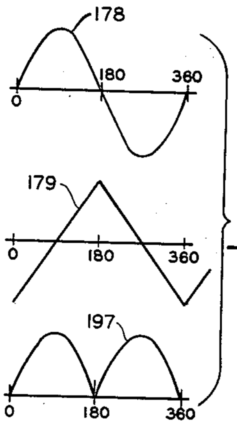
Fig. 8 is a diagrammatic view showing some of the electrical wave forms produced by certain of the circuits incorporated in my apparatus.

The circuit in which the tube 168 is incorporated is provided for the purpose of converting the sign wave output from the amplifier 164 into a pyramidal-shaped wave which is 90° out of phase with the voltage from the amplifier. This condition is indicated in Fig. 8 in which the sine wave appearing at a terminal 279 connected to the output of the amplifier is indicated by reference numeral 178 while the pyramidal-shaped wave supplied to the grid of the amplifier tube 177 is indicated by reference numeral 179.

Referring again to the circuit involving the tube 168, it will be observed that the grids of this tube are driven in phase opposition by the alternating voltage output from the transformer 165. That is, when one grid goes negative the other goes positive and vice versa. It is also to be noted that due to the high voltage supplied to the grids by the secondary of the transformer, each section of the tube is driven far beyond saturation when its grid is positive, and far beyond cut-off when its grid is negative. Thus, the tube 168 has both a commutating or switching function and it also serves as a current limiter in the sense that the saturation current is limited to a fixed value. The section of the tube which is driven positive, conducts current and charges the capacitor 172 through the primary winding of the transformer 171. The time constant of this charging circuit, if it may be called such, is much greater than the period of conduction of either section of the tube 168 so that the charge acquired by the condenser during the period of conduction is very small in proportion to the maximum charge which it can acquire over a long period of time. Since the charging of the condenser is limited to the lower, linear portion of the charging curve thereof, and since the current flow through the tube is constant, the condenser charges at a linear rate so as to produce a true pyramidal wave form as illustrated in Fig. 8. When both grids again return to zero as for example, at the 180° point of the wave 178 in Fig. 8, the charge on the condenser 172 will be at a maximum which is represented by the tip of the pyramidal wave 179. The other section of the tube 168 now becomes conductive thereby reversing the direction of charge of the condenser 172 as indicated by the downward sloping portion of the curve 179 between the 180° and 360° points thereof. When the tube 168 again switches, as for example, at the 360° point of the curve 178, the condenser 172 will commence to charge in the opposite direction as indicated by the upward slope of the curve 179. Hence, there appears in the secondary winding of the transformer 171 a pyramidal wave of the form represented by the curve 179 in Fig. 8. As shown by the curves of Fig. 8, the pyramidal wave 179 is 90° out of phase with the sine wave 178 appearing at the terminal 279 connected to the output of the amplifier 164.

The previously described pyramidal wave generating circuit has been found to produce a pyramidal wave form which is accurate as to shape and which is exactly 90° out of phase with the input voltage. It will be found with this circuit that the phase shift is independent of the frequency of the input signal, or of the plate voltage on the tube 168, or of variations in the values of the circuit components. While the circuit is not at all critical in any respect, the following values of the various components of the circuit will be given so as to permit an exact reproduction of the circuit to be constructed without need of any experimentation whatsoever. The values of the components for operation in the neighborhood of 400 cycles per second are as follows: Condensers 166 and 167, 0.02 mf.; resistors 169 and 170, 470,000 ohms; tube 168, 6SN7; condenser 172, 0.1 mf.; transformer 171, Stancor A4711 having 1:1 turns ratio with 1700 ohms D. C. and 17.7 henries inductance on the grid sides and 1380 ohms D. C. and 17.2 henries on the plate side; condenser 174, 0.001 mf.; and resistor 175, 50,000 ohms.

The output from the pyramidal wave generator circuit is applied, as earlier mentioned, by the conductor 176 to the grid of a cathode biased amplifier tube 177. This tube is shown in the drawings as a triode but may be of any type suitable for use as a voltage amplifier. The plate of this tube is provided with positive voltage from the conductor 173 through the primary winding of a transformer 185. The amplifier pyramidal wave appearing in the plate circuit of the tube 177 will thereby be transmitted to the secondary winding of the transformer 185, one side of which is grounded as indicated in Fig. 18. The other side of the secondary winding is connected through a T-pad 186 of conventional design to a conductor 187. One set of deflection coils 188 of the scanning yoke 137 of the cathode ray tube, hereinafter referred to as the lateral deflection coils, is connected between the conductor 187 and ground. The amplitude of the pyramidal sweep voltage applied to the coils 188 may be varied as desired by adjustment of the T-pad 186 which presents constant impedance to the circuit regardless of its setting. Hence, the lateral deflection of the electron beam of the cathode ray tube will be controlled by the pyramidal voltage supplied thereto in the manner above described so that the beam will be oscillated back and forth at a constant speed in both directions of sweep.

The scanning yoke 137 of the cathode ray tube is provided with a second set of deflection coils designated in Fig. 18 by reference numeral 189. The magnetic field produced by those coils is at right angles to that produced by the coils 188 and, hence, the deflection coils 189 will hereinafter be referred to as the longitudinal deflection coils. If only the pyramidal voltage were to be applied to the lateral coils 188 with no voltage applied to the longitudinal deflection coils 189, the trace produced on the screen of the cathode ray tube would be a straight line. However, for reasons to be hereinafter described, it is usually desirable to use a curved trace in place of a straight one. For this purpose, a longitudinal deflection voltage generator is provided herein whereby desired amounts of curvature may be introduced into the trace. As shown in Fig. 18, the grid of a triode vacuum tube 190 is connected with the secondary winding of the transformer 165 through a condenser 191 and a potentiometer 192. The tube 190 is provided with a conventional cathode biasing circuit and the plate of the tube is furnished with positive potential from the plate supply source through the primary winding of a transformer 193. The secondary winding of this transformer is provided with a grounded center tap while the ends thereof are each connected through a rectifying element 194 with the input of a T-pad 195, the output of which is connected by a conductor 196 with one terminal of the pair of longitudinal deflection coils 189. The other terminal of these coils is connected to ground so that a voltage of desired value may be applied to the coils by suitable adjustment of the T-pad 195.

Figure 9:
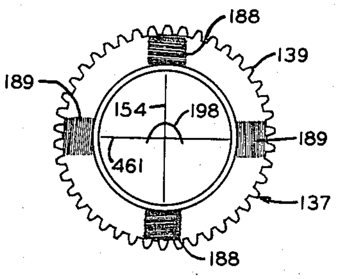
Fig. 9 is a diagrammatic view showing the rotatable scanning yoke for the cathode ray tube which produces the curved trace.

From the preceding description of the circuit including the vacuum tube 190, it will be observed that the 400 cycle voltage supplied to the tube is amplified thereby and thereafter rectified by the full-wave rectifying device comprised of secondary winding of transformer 193 and the rectifying elements 194. Hence, the voltage supplied to the T-pad 195 will be of the wave form indicated by the curve 197 in Fig. 8. The amplitude of the rectified voltage 197 supplied to the longitudinal deflection coils of the cathode ray tube may be varied from zero to a maximum by T-pad 195. The sensitivity of the adjustment provided by the T-pad 195 may be controlled by manipulation of the potentiometer 192 which determines the amplitude of the input voltage supplied to the tube 190. As may be seen from Fig. 8, the curvature in the sweep pattern introduced by the longitudinal deflection voltage 197 will be the same for both the forward sweep and the return sweep produced by the pyramidal voltage 179. Hence, when a substantial amount of longitudinal deflection voltage 197 is introduced into the deflection coils 189, the sweep path of the electron beam will have the shape indicated in Fig. 9 where the trace thereof is indicated by reference numeral 198. The lateral deflection coils 188 and the longitudinal deflection coils 189 are diagrammatically illustrated in Fig. 9, the coils 188 producing a magnetic field in the vertical direction as viewed in Fig. 9 so as to provide sidewise displacement of the electron beam, while the longitudinal deflection coils 189 produce a magnetic flux in the horizontal direction as viewed in Fig. 9 so as to produce vertical displacement of the beam.

As previously mentioned herein, the scanning yoke 137 may be rotated by means of the ring gear 139 formed thereon so as to rotate the trace 198 simultaneously therewith. Rotation of the yoke is enabled by slip rings 142 and stationary brushes 140. In the present embodiment of the invention, the conductor 187 is connected through brushes 140 with one of the slip rings 142, while the conductor 196 is connected through other brushes with another of the slip rings. The third slip ring is connected with ground through still other of the brushes 140. In this way, the sweep voltages produced by the circuits shown in Fig. 18 can be supplied to the yoke 137 while it is being rotated about the longitudinal axis of the cathode ray tube by means of the gear 139.

TRACE POSITION CONTROLLING DEVICE

Figure 10:
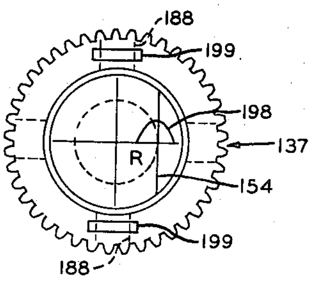
Fig. 10 is a diagrammatic view illustrating the deflection of the trace to compensate for the diameter of the cutter.

As is well known in the automatic profiling machine art, it is necessary to be able to adjust the tracer mechanism for different diameter cutters. In the mechanical type of tracer, the diameter of the cutter may be compensated for by providing a button or roll of a diameter equal to that of the cutter on the tracer element which follows the templet. In my device, however, there is no mechanical element engaging with the edge of a templet, but merely a beam of radiant energy following along a pattern line. It is therefore necessary to be able to adjust the position of the trace with respect to the longitudinal axis of the cathode ray tube in order to allow for use of different sizes of cutters. For this purpose, I have provided a system of permanent magnets carried by the rotatable scanning yoke for introducing this steady deflection of the trace to allow for the diameter of the cutter being used. As diagrammatically shown in Fig. 10, a pair of permanent magnets 199 are mounted on the yoke 137 in alignment with the lateral deflecting coils 188 so as to establish a magnetic field coinciding with the field produced by the coils 188. Hence, the trace 198 will be deflected sideways or in a direction at right angles to the direction of travel of the trace along the pattern line 154. The amount of this deflection of the trace should be equal to R which, as indicated in Fig. 7, represents the radius of the cutter 39.

Figure 11:
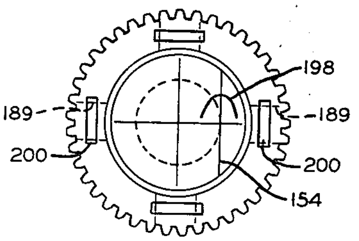
Fig. 11 is a diagrammatic view illustrating deflection of the trace to introduce anticipation into the system.

As is also well known in the automatic profiling machine art, it is desirable to cause the tracing element to slighhtly lead the cutting tool so as to introduce what is known as anticipation or eccentricity. A certain amount of anticipation is desirable in these automatic profiling devices in order to compensate for the unavoidable lag inherent in the automatic control system. That is, a certain amount of delay naturally occurs between the time when the tracing element signals a change in direction until that change can be effected in the feed mechanism of the machine tool. While the introduction of curvature into the trace 198 by the vertical sweep voltage 197 (Fig. 8) advances the point where the trace crosses the pattern line thereby introducing a small amount of anticipation, it is desirable to provide independent means for adjusting the position of the trace in the direction of its movement along the line being followed so that the amount of anticipation may be controlled as desired. This advancement of the trace in the direction of travel will also introduce feedback into the system for the reason that rotation of the scanning yoke will tend to bring the center of the trace back on the pattern line. For the purpose of thus adjusting the trace, a second permanent magnet deflecting means is provided on the rotatable yoke 137. As diagrammetically shown in Fig. 11, a pair of magnets 200 are located in alignment with the longitudinal deflection coils 189 so as to produce a magnetic field which is in the same direction as that produced by these coils. Hence, depending upon the strength of the field produced by the magnets 200, the trace 198 may be deflected varying amounts in the direction of the pattern line 154.

One possible form of embodiment of this trace position controlling device is shown in Figs. 4, 5 and 6 where it is indicated generally by reference numeral 205. As shown in the drawings, this device is formed of a block 206 of light, non-magnetic material, such as aluminum, which is bolted to an adapter plate 204 which is recessed to receive snugly therein the upper end of the sleeve 138 of the scanning yoke. The block assembly is apertured to receive the neck of the cathode ray tube and is prevented from rotating relative to the sleeve 138 by screws 207 (Fig. 4). Incorporated within the block 206 near the top thereof is a pair of pole pieces 208 which, as shown in Fig. 5, are cut out to receive the neck of the cathode ray tube 130. The pole pieces are likewise cut out to receive a circular biasing magnet 209 which is preferably a permanent magnet and which, as shown in Fig. 4, is mounted on the lower end of a shaft 210 journaled in the block 206. When the magnet 209 is in the position shown in Fig. 5, the lines of magnetic flux are shunted directly from one pole to the other through the pole pieces 208 so that there will be no magnetic field passing across the gap between the pole pieces and through the neck of the cathode ray tube. However, as the magnet is turned by means of shaft 210, this condition will no longer prevail and one of the pole pieces 208 will become a north pole while the other pole piece will become a south pole. Hence, a magnetic field will be created in the gap between the pole pieces occupied by the neck of the cathode ray tube and the strength of this field may be varied in accordance with the rotational positioning of the magnet 209. As previously mentioned, the magnetic field will be zero when the magnet 209 is in the position shown in Fig. 5. When the magnet is rotated from the Fig. 5 position, the magnetic field between the pole pieces will increase until the magnet is in a position at right angles to the position shown in Fig. 5 when the magnetic field passing through the neck of the cathode ray tube will be a maximum. Since the electron beam of the cathode ray tube will be deflected at right angles to the direction of magnetic flux, the deflection of the beam will be either in the direction of arrow 211, or in the opposite direction, depending on the direction of rotation of the magnet 209 from the Fig. 5 position. In the present embodiment of the invention, the magnet 209 is used to introduce anticipation into the system and therefore the magnetic field produced by this magnet between the pole pieces 208 will lie in alignment with the magnetic field produced by the longitudinal deflection coils 189. The direction of deflection of the beam for anticipation is indicated by the arrow 211 which also indicates the direction of travel of the cutter relative to the work. Hence, the arrow 211 always points in the same or opposite direction as the arrow 122 (Fig. 3) which indicates the direction of maximum eccentricity of the eccentric 57.

A similar system is provided for producing a deflection of the beam to allow for the cutter diameter although the magnetic axis of this second system lies at right angles to the one just described. The cutter diameter adjusting device includes a pair of pole pieces 212 which lie beneath the pole pieces 208 and are disposed at right angles thereto. These pole pieces, like the pole pieces 208, are cut out to receive the neck of the cathode ray tube and also to receive a circular biasing magnet 213 which, like the magnet 209, is preferably a permanent magnet and is mounted on the lower end of a shaft 214 journaled in the block 206. Hence, a selected amount of deflection of the cathods ray beam in a direction at right angles to the arrow 211 may be introduced by proper rotational positioning of the magnet 213.

The means for adjusting the magnets 209 and 213 is best shown in Fig. 6. As herein shown, the shaft 210 of the anticipation magnet has secured to its upper end a bracket 215 which carries an adjusting screw 216 that is held in contact with a stop 217 by a spring 218. Hence, the rotational position of the anticipation magnet 209 may be adjusted by rotation of the adjusting screw 216.

The adjustment of the cutter diameter magnet 213 is effected in a similar manner although in this case provision is made for fine and coarse adjustments of the magnet since a much wider range of deflection must be provided for due to the considerable variation in the diameter of cutters used. As shown in Fig. 6, the upper end of the shaft 214, which carries the cutter diameter magnet 213, has secured thereto an arm 219 which carries at its outer end a locating pin 220. The end of this pin is adapted to be received in any one of a plurality of holes 221 formed in a plate 222 loosely journaled on the shaft 214. Integral with the plate 222 is a boss 223 which is threaded to receive an adjusting screw 224 which is held against a stop 225 by means of a spring 226. Hence, by lifting the pin 220 and selecting a different hole 221, a coarse adjustment of the magnet position may be obtained. The adjusting screw 224 may then be rotated to achieve a fine adjustment of the deflection of the trace 198 (Fig. 10) to suit any required diameter of cutter. Access may be had to the adjusting screws 216 and 224 and locating pin 220 through an opening in the head covered by a removable plate 228.

The scanning yoke 137 and the trace position controlling device 205 carried thereby are constantly maintained in rotational alignment with the eccentric 57 by means of a gear train connecting the ring gear 139 on the yoke with the gear 109 (Fig. 2) mounted on the tracing head spindle 106. As shown in Fig. 4, the gears 109 and 139 are both of the same pitch diameter and both mesh within an intermediate gear 227. Hence the gears 109 and 139 will always rotate in the same direction and at the same speed.

*Photoelectric pick-up*

As explained earlier herein, the phototube 153 (Fig. 4) detects the change in the amount of radiant energy reflected from the pattern each time the light beam crosses the pattern line 154. The phototube is preferably of the electron multiplier type since the response thereof to small changes in the incident light thereon is much greater than in the case of the conventional two element phototube. As shown in Fig. 19, the phototube 153 is a 9-stage type having nine multiplier dynodes 232, an anode 233, and a light-sensitive cathode 234. The power supply for the tube includes a power transformer 235 having a primary winding that may be supplied with 110 v., 60 cycle current from any suitable source. The high-voltage secondary winding has connected in series therewith a half-wave rectifier tube 236 and a plurality of series connected resistors 237–248. The resistors 237, 238 and 248, in conjunction with the shunting condensers 249, 250, 251 and 252, provide a resistance-capacitance filter for reducing the ripple across the resistance load consisting of resistors 239–247. The resistors 239 to 247, inclusive, form a voltage divider which supplies the necessary potential differences to the nine dynodes 232. The cathode 234 is connected to the negative side of the voltage divider so that each of the dynodes is at a higher potential than the cathode, the dynodes each being supplied with constantly increasing voltage until the anode 233 is reached. This element of the tube is supplied with positive potential from the B+ supply so that the voltage thereon is several hundred volts higher than that of the adjacent dynode which is at ground potential. Hence, each time a pulse of radiant energy strikes the cathode 234, a sizeable current will flow from the cathode to the anode by way of the dynodes 232. This current will cause a voltage drop across the load resistor 253 which is applied by condenser 254 to the lead 255 which is connected to the grid of a triode type amplifying tube 256 (Fig. 20). Therefore, each time a pulse of radiant energy is received by the cathode 234 of the phototube, a voltage drop will occur across the load resistor 253 and a negative pulse will be transmitted to the grid of the tube 256.

*Deviation detecting means*

Figure 12A:
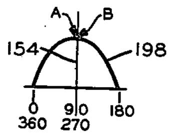
Figure 12B:
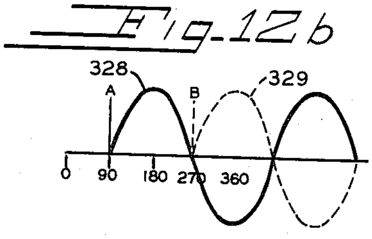
Figure 12C:
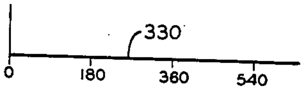
Figure 12D:

Referring to Fig. 12*a*, each time the moving spot of light produced by the cathode ray tube is swept across the pattern line 154 in the forward direction, i. e., from 0° to 180°, an electrical impulse of short duration will be produced by the phototube 153 at the instant the spot crosses the pattern line. When the trace 198 is centered on the line as illustrated in Fig. 12*a*, this impulse will be produced exactly 90° after the commencement of the scan in the forward direction. It will be seen by referring to *Fig.* 8, which shows the phase relationship between the 400 cycle reference voltage 178 and the lateral sweep voltage 179, this impulse will be produced at the one-quarter cycle point of the reference voltage. The impulse thus produced on the forward sweep of the moving light spot is hereinafter referred to as the A pulse and is indicated in Fig. 12*b* as a single vertical line at the 90° point on the time axis. In a similar maner, on the return sweep of the moving spot of light, i. e., from 180° to 360°, (Fig. 12*a*) a second electrical impulse will be produced by the phototube, this impulse being hereinafter referred to as the B pulse. These pulses will be of relatively short duration since the cathode ray tube 130 is provided with a screen of the short persistence type and since the width of the line scanned is only a fraction of the lateral length of the trace. In the "on line" condition illustrated by Figs. 12*a* to 12*d*, this pulse will be produced 270 electrical degrees after the commencement of the forward sweep and at the three-quarter cycle point of the reference voltage. The position of the B pulse along the time axis is indicated in Fig. 12*b*.

Figure 14A:
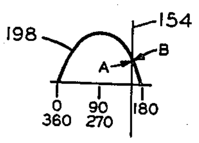
Figure 14B:
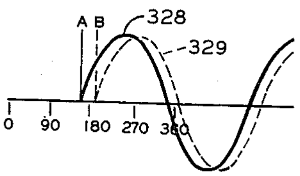
Figure 14C:
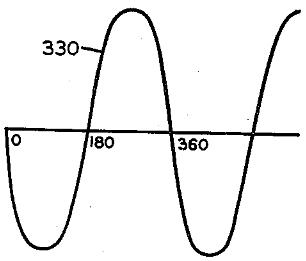
Figure 14D:
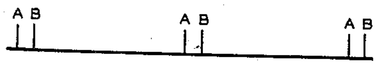
Figure 16A:
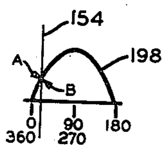
Figure 16B:
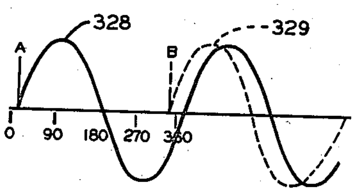
Figure 16C:
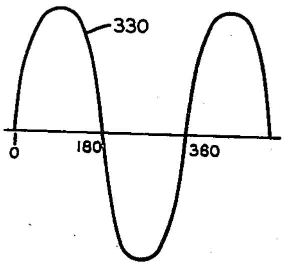
Figure 16D:

If now, the trace 198 has departed slightly to the left of the pattern line as indicated in Fig. 13*a*, the A pulse will occur a little later in the cycle than in the case where the trace is "on line," while the B pulse will occur somewhat earlier in the cycle. The time in the cycle when these pulses occur is shown in Fig. 13*b* from which it will be observed that the pulses have moved toward one another and are approaching the 180° point of the cycle. In Fig. 14*a*, the trace is shown moved still further to the left of the line so that now the A pulse occurs shortly before the 180° point of the cycle while the B pulse occurs shortly after this point. As shown in Figs. 14*b* and 14*d*, the A and B pulses are now very close together although the consecutive A pulses are still 360° apart as are also the consecutive B pulses. Considering next the condition in which the trace 198 is to the right of the pattern line, it will be observed from Fig. 15*a*, that the A pulse will now occur slightly before the 90° point of the cycle while the B pulse will occur shortly after the 270° point thereof. If now, the trace 198 is still further to the right of the line 154, the A pulse will occur shortly after the 0 point of the cycle while the B pulse will occur slightly before the 360° point thereof. As indicated in Fig. 16*d*, the pulses will occur very close together when the condition illustrated in Fig. 16*a* prevails, with the B pulse preceding the A pulse.

Referring now to Fig. 20 of the drawings, the A and B pulses produced in the output of the phototube 153 are, as previously mentioned, applied to the grid of tube 256 on which they appear as negative pulses. The tube 256 is a zero biased amplifying tube whose cathode is connected directly to ground and whose grid is connected to ground through a conventional grid resistor 261. Plate voltage from the B+ supply is furnished to the plate of the tube 256 through a load resistor 262. The plate of tube 256 is also connected through a resistor 263 and a pair of similar resistors 265 and 266 with the plates of a twin triode tube 264. The grids of the tube 264 are driven alternately plus and minus in phase opposition by means of a center-tapped transformer 267. One side of the primary winding of this transformer is grounded while the other side thereof is connected to the terminal 279 (Fig. 18) on the output of the amplifier 164. Each end of the secondary winding of the transformer 267 is connected to one of the grids of the tube 264 while the center tap thereof is grounded as is also the cathode of the tube. The plates of the tube 264 are connected directly to the grids of a second twin-triode tube 268. A positive potential in the neighborhood of from 50 to 150 v. is applied to the cathode of the tube 268 by means of a voltage divider including a resistor 269 and a potentiometer 270 which are connected in series between the plate supply and ground. The cathode of the tube is connected to the slider of the potentiometer which is by-passed to ground through a condenser 271. Thus, the positive potential on the cathode may be varied by adjustment of the slider. The plates of the tube 268 are supplied with positive potential through load resistors 272 and 273 which are connected with the plate voltage lead.

The circuits shown in Fig. 20, comprise a pulse separating circuit which operates to separate the A pulses from the B pulses and route them into separate channels. This is accomplished as follows: The twin-triode tube 264 which operates as a gating and clamping tube, is periodically rendered conductive and non-conductive by the 400 cycle alternating voltage applied to the grids thereof. That is, when one of the grids is driven positive beyond the saturation point, that section of the tube will be rendered conductive. At the same time, however, the other section of the tube will be driven beyond cutoff by the large negative voltage applied to the grid thereof so that this section of the tube will be rendered non-conductive. The side of the tube which is rendered conductive will constitute a very low impedance in the circuit extending from the B+ lead to ground through resistors 262, 263, 266 or 265, and the appropriate section of the tube 264 to the grounded cathode. Consequently, the plate of the conductive side of the tube will be effectively clamped at approximately ground potential during the time that its grid is positive. On the other hand, the side of the tube whose grid is negative will constitute an almost infinite impedance so that its plate will be at a potential approximately equal to that of the junction 274 where the three resistors 263, 265 and 266 are joined.

In this circuit, it is further to be noted that since the tube 256 is operated at zero bias, a large voltage drop will normally occur across the load resistor 262 of this tube. Hence, the plate of the tube 256 will normally be at a relatively low voltage as will also the junction 274. However, when a negative pulse is delivered to the grid of the tube 256 from the phototube, the impedance of the tube 256 will be greatly increased and the voltage on the plate thereof will rise sharply to a voltage approaching that of the B+ supply. The only voltage drop occurring in the resistor 262 will be that due to the current flowing through the conducting side of the tube 264. The junction point 274 will participate in this sharp rise in voltage and the plate of the non-conductive side of the tube 264 will likewise rise to a relatively high voltage. This will cause the grid of the tube 268 connected thereto to rise to a potential above that of the cathode of the tube 268 so that a voltage drop will occur across the load resistor 272 or 273. However, in the case of that side of the tube 264 which is conductive at this time, the plate thereof will remain clamped at approximately ground potential so that the grid of the section of the tube 268 connected thereto will be maintained highly negative with respect to the cathode of the tube 268 and no voltage drop will be produced across its load resistor 272 or 273. It will therefore be seen that since the scanning of the light spot back and forth across the pattern line is always maintained precisely in phase with the 400 cycle voltage applied to the primary winding of transformer 267, all A pulses will be received on the grid of the tube 256 at a time when one of the grids of the tube 264 is minus, while all B pulses will be received at a time when the other of the grids is minus. If we assume that the connections to the transformer 267 are such that the grid of the upper section of the tube 264 will be minus during the half cycle that a forward scan of the moving spot of light is taking place, i. e., when A pulses are produced by the phototube 153, then the A pulses can only pass through the upper section of the tube since the plate of the lower section is clamped to ground at this time. Hence, the A pulses will appear in the output of the upper section of the tube 268 and will be delivered by a blocking condenser 275 to an output lead 276. In a similar manner, all B pulses arriving on the grid of the tube 256 will occur at a time when the grid of the lower section of tube 264 is minus so that these pulses will pass through the lower section of the tube 268. The B pulses will be unable to pass through the upper section of the tube 264 since, at this time, the grid thereof will be positive and the plate will be clamped to ground. Hence, the B pulses will be transmitted to an output lead 278 through a blocking condenser 277. In this circuit, of course, the positive potential on the cathode of tube 268 must be greater than the normal potential of the junction 274, i. e., the potential when no pulses are being received by the tube 256, and preferably this cathode potential is made much higher than that of junction 274 so that any spurious responses received by the tube 256 will not be able to produce a signal in the output circuits of the tube 268. In fact, it is desirable that the positive bias on the cathode of the tube 268 should be sufficiently high that the normal A and B pulses received by the tube 256 will produce just sufficient signals in the output leads 276 and 278 to operate the succeeding stage or circuit.

The A and B pulses are transmitted by leads 276 and 278, respectively, to the grids of a conventional zero biased twin triode amplifying tube 283 (Fig. 21) which converts the negative impulses into positive pulses appearing across load resistors 284 and 285, respectively. These pulses are transmitted by blocking condensers 286 and 287 to the left-hand grids of a pair of twin triode vacuum tubes 288 and 289. These tubes and the circuit elements associated therewith receive the narrow A and B pulses and widen them into rectangular pulses of 1/800 second duration. Since the time interval between adjacent A pulses, and likewise between adjacent B pulses, is 360° or 1/400 second there will thereby be produced in each circuit a rectangular pulse 1/800 second wide every 1/400 second. Thus, there is produced in each circuit a square wave having a frequentcy of 400 cycles per second, the leading edge of each square wave coinciding with the occurrence of an A pulse or a B pulse. This square wave is generated in the circuits associated with tubes 288 and 289 in the following manner:

With reference to the tube 288, the left-hand section of the tube is normally non-conductive while the right-hand section thereof is normally conductive. This is caused by the biasing arrangement on the tube which permits the right-hand section to conduct while the left-hand section is biased to cut-off. As shown, both cathodes of tube 288 are connected to ground through a common cathode resistor 290. The grid of the right-hand section is connected through a resistor 291 with the slider of a potentiometer 292 which is connected in series with a resistor 293 between the plate supply lead and ground. A positive potential is thereby applied to the grid and causes the right-hand section of the tube to conduct. The plate of this section is connected to the plate supply lead through a resistor 294 across which a voltage drop will occur due to the conduction of the tube. A state of equilibrium will be reached when the voltage drop across the cathode resistor 290 and the load resistor 294 reach a point of stability determined by the flow of current through the tube induced by the positive potential applied to the grid thereof. In this condition of equilibrium, the potential drop across the cathode resistor 290 is sufficient to bias the left-hand section of the tube 288 to cut-off so that no current will flow through this section and there will be no voltage drop across a load resistor 295 connected between the plate of this section and the plate supply lead. This is the stable state of the circuit and it will remain in this condition until a positive A pulse is introduced on the grid of the left-hand tube section through condenser 286. Due to amplification of the pulse by tube 283, it will be sufficiently positive to overcome the negative bias on the grid of the left-hand section of tube 288 and cause this section of the tube to conduct. This causes a voltage drop to occur across the load resistor 295 thereby driving the right-hand section of the tube to cut-off through a condenser 296 connected between the plate of the left-hand section and the grid of the right-hand section of the tube. The right-hand section thereby becomes non-conductive and the current flowing through the cathode resistor 290 is reduced thereby enabling the left-hand section to remain conductive. Due to the maintenance of the voltage drop across the load resistor 295, the condenser 296 continues to discharge through grid resistor 291 and potentiometer 292. The time constant of this discharge circuit is such that the right-hand section of the tube remains non-conductive for 1/800 second after which it again begins to conduct and thereby again biases the left-hand section of the tube to cut-off. The circuit then remains in this state until another positive pulse is received on the grid of the left-hand section of the tube 1/800 second later.

It will thus be observed from the foregoing description that when a positive A pulse is received on the grid of the left-hand section of the tube 288, the right-hand section thereof will become non-conductive and the voltage on the plate will rise sharply to a potential approximately equal to the plate supply voltage. It will remain at this voltage for 1/800 second, whereupon it will drop sharply to its original value when this section of the tube again becomes conductive. Hence, a positive, rectangular pulse 1/800 second wide will be transmitted through the blocking condenser 297 to the grid of the next tube. It will also be observed that the leading edge of this positive, rectangular pulse is in phase with an A pulse, i. e., it occurs simultaneously with the generation of an A pulse by the phototube.

The pulse width of the positive, rectangular pulse generated by the tube 288 may be adjusted to exactly 1/800 second by manipulation of potentiometer 292 which changes the balance point of the circuit and, hence, the time at which the right-hand section of the tube will cut back in. In this way, the period of non-conduction of the right-hand section of the tube may be increased or diminished until the correct pulse width is attained.

In this circuit, a condenser 298 is preferably connected across the load resistor 295 in order to prevent a voltage drop from occurring across this resistor when random impulses of very short duration are received by the grid of the left-hand section of the tube.

The circuit involving the tube 289 operates in a similar manner to produce a squre-wave voltage from the B pulses received on the left-hand grid of the tube. The leading edge of each positive inflection of this square wave will coincide in point of time with the occurrence of a B pulse. The elements 300—308 of this circuit correspond to the elements 290—298 of the circuit above described.

To facilitate comparison of the phase relation of the two square-wave voltages produced from the A and B pulses, these waves are fed into a shaping circuit where the square waves are changed into sine waves without any change in the phase thereof. The sine-wave shaping circuit for the square-wave voltage produced from the A pulses includes a triode vacuum tube 314 the grid of which is connected to the slider of a potentiometer 315 connected between the output from condenser 297 and ground. A negative bias is applied to the tube 314 by means of an unbypassed cathode resistor 316 so that considerable degeneration is introduced into the circuit. Plate voltage is supplied to the tube through the primary winding of a transformer 317, one end of the winding being connected to the plate supply lead and the other end connecting to the plate of the tube 314. A condenser 318 is connected across the primary of the transformer 317 so as to provide a parallel resonant circuit in the plate circuit of the tube. The values of the components of this circuit should be so chosen that the circuit will be substantially out of resonance at 400 cycles per second thereby avoiding the voltage peaks which a resonant circuit would produce. As the grid of the tube 314 is driven plus and minus by the square-wave voltage applied thereto, the condenser 318 will alternately charge and discharge, partly through the primary winding of the transformer, and partly through the tube 314. There will thereby be produced in the secondary winding of the transformer 317 a voltage having a wave form very closely approximating that of a sine-wave.

To enable one desiring to reproduce this sine-wave shaping circuit to do so without any need for experimentation in order to determine the proper values of the circuit components, the following data is hereby given: condenser 297, 0.1 mf.; potentiometer 315, 100,000 ohms; tube 314, ½ 6J6; resistor 316, 5800 ohms; condenser 318, 0.1 mf.; and transformer 317, Stancor A53C having a turns ratio of 3:1 with 400 ohms D. C. and 2.25 henries inductance in the primary winding, and 1520 ohms D. C. and 17.1 henries in the secondary winding.

The sine-wave shaping circuit for the square-wave voltage produced from the B pulses is identical with the one just described and includes the same circuit components including a potentiometer 319, a cathode resistor 320, a triode vacuum tube 321, a transformer 322 and a condenser 323.

The sine-wave voltages appearing in the secondary windings of the transformers 317 and 322 are mixed by connecting these windings in series so as to produce a voltage whose value at any instant is equal to the vector sum of the values of the two sine-wave voltages at the same instant. This resultant voltage is applied across a condenser 324 which has one terminal grounded as indicated in Fig. 21. The other terminal is connected to a lead 325 by means of which the resultant voltage may be applied to the next stage or circuit of my apparatus.

Referring once again to the diagrammatic views of the drawings illustrating the phase relationship between the A and B pulses, it will be seen that in the "on line" condition of the trace 198 as illustrated in Fig. 12*a*, the A and B pulses are exactly 180° apart as illustrated in Fig. 12*b*. In this figure, the sine wave which is formed from the square wave which is initiated by the occurrence of A pulses, is designated by reference numeral 328, while the sine wave formed from the square wave initiated by the B pulses is indicated by reference numeral 329. Since the A and B pulses are 180° apart, the sine-wave voltages 328 and 329 will be exactly 180° out of phase as shown. Assuming that the potentiometers 315 and 319 (Fig. 21) have been suitably adjusted to cause the amplitude of the voltages 328 and 329 to be equal, then the sum of the two voltages will be zero as indicated by the straight line 330 shown in Fig. 12*c*. In other words, the voltage appearing across the condenser 324 in Fig. 21 will be zero.

If the trace 198 is slightly to the left of the line as shown in Fig. 13*a*, the sine-wave voltages 328 and 329 produced by the A and B pulses will be somewhat less than 180° apart as indicated in Fig. 13*b* and the sum of these two voltages will be as represented by the curve 330 in Fig. 13*c*. It is to be observed that the voltage represented by the curve 330 is 180° out of phase with the 400 cycle reference voltage 178 (Fig. 8) produced by the generator 158 (Fig. 18). If the trace 198 is still further to the left of the line as indicated in Fig. 14*a*, the two sine-wave voltages 328 and 329 will be very nearly in phase with one another thereby producing a resultant voltage 330 of increased amplitude. It will be noted that the voltage 330 shown in Fig. 14*c* is in phase with the resultant voltage shown in Fig. 13*c* and that both of these voltages are 180° out of phase with the 400 cycle reference voltage. Hence, the voltage appearing across the condenser 324 in the mixing circuit shown is Fig. 21 will vary from zero, when the trace is "on line" to a maximum value when only the tip of the trace remains on the pattern line. It will also be noted that as the trace moves from an "on line" position to a position further and further to the left of the pattern line, the amplitude of the resultant voltage will constantly increase as the deviation increases, while the phase of the resultant voltage will not change and will remain 180° out of phase with the 400 cycle reference voltage.

When the trace 198 is slightly to the right of the pattern line as illustrated in Fig. 15*a*, it will be observed from Fig. 15*b* that the voltages 328 and 329 are more than 180° out of phase so that a resultant voltage 330 (Fig. 15*c*) representing the sum of the two voltages 328 and 329 will be produced. This voltage, it will be noted, is in phase with the 400 cycle reference voltage. If the trace 198 is still further to the right of the pattern line as indicated in Fig. 16*a*, then the two sine-wave voltages 328 and 329 will be very nearly in phase with one another so as to produce a large resultant voltage 330 (Fig. 16*c*). Here again, the voltage 330 will be of the same phase as the voltage 330 in Fig. 15*c*, i. e., in phase with the 400 cycle reference voltage.

This change in the phase and amplitude of the resultant voltage 330 appearing across the condenser 324 when the trace 198 moves from an "on line" condition to either the right or left of the pattern line is illustrated by the graph shown in Fig. 17. In this graph the line 331 depicts the change in amplitude and phase of the resultant voltage 330 in the various positions of the trace 198 with reference to the pattern line 154. As indicated by this line, when the trace moves to the left of the pattern line, the resultant voltage increases in amplitude from zero to a maximum and is 180° out of phase with the 400 cycle reference voltage. On the other hand, when the trace moves to the right of the pattern line, the voltage again increases in amplitude from zero to a maximum and is in phase with the 400 cycle reference voltage. The phase of the resultant voltage 330, therefore, indicates the direction of deviation of the trace from the pattern line, while the amplitude thereof indicates the extent of deviation. It is to be noted that the foregoing considerations will hold true regardless of the thickness of the pattern line and, hence, my apparatus will always tend to follow the center of the line.

*Deviation correcting means*

Means is provided for utilizing the reference voltage produced across the condenser 324 to operate the steering mechanism of the machine tool to bring the trace back to the "on line" condition. For this purpose the lead 325 (Fig. 22) is connected to one end of the primary winding of a center-tapped transformer 333, the other end of the primary winding being connected to ground through secondary windings 334 and 335 of a variable differential transformer 336. The ends of the secondary winding of the transformer 333 are connected to the left-hand grids of a pair of twin-triode vacuum tubes 337 and 338. Also, as shown in Fig. 22, the grids of the twin-triode tubes are cross-connected, that is, the left-hand grid of the tube 337 is connected with the right-hand grid of the tube 338, while the left-hand grid of the tube 338 is connected with the right-hand grid of the tube 337. The center tap of the secondary winding of transformer 333 is connected to the cathodes of the tubes 337 and 338. The plates of the tubes are driven in phase opposition by alternating voltages derived from the 400 cycle source 158. To this end, a center-tapped transformer 339 is provided for the tube 337 and a similar transformer 340 is provided for the tube 338. As indicated herein, the primary windings of the two plate supply transformers are supplied with 400 cycle alternating current from the generator 158. The opposite ends of the secondary windings of the two transformers are connected to the plates of their respective tubes so as to drive these plates 180° out of phase. Also, as shown, the center tap of the secondary winding of transformer 339 is connected with the cathodes of the tubes through a resistor 341. In a like manner, the center tap of the secondary winding of transformer 340 is connected to the cathodes of the tubes through a similar resistor 342. The center taps of transformers 339 and 340 are also each connected to ground through resistors 343 and 344, respectively. The transformers 339 and 340 should be so connected that the plates of the left-hand sections of the tubes 337 and 338 are both of the same polarity, while the plates of the right-hand sections of the tubes are likewise of the same polarity.

The circuit illustrated in Fig. 22 is effective to produce a rectified voltage having a magnitude corresponding to the amplitude of the resultant voltage 330 and a sign corresponding to the phase of that voltage. To understand the operation of the phase sensitive rectifier, let it be assumed that the left-hand grid of the tube 337 is driven positive by a signal voltage of large amplitude at the same time that the plate of this section swings positive. Under these circumstances, the left-hand section of the tube 337 will conduct and cause a voltage drop to occur across the resistor 341 with the upper end of the resistor negative and the lower end positive. However, neither of the right-hand sections of the tubes will conduct since the plates thereof are negative, and the left-hand section of the tube 338 will be unable to conduct since its grid is negative.

Now consider the conditions which exist during the next half cycle. The left-hand grid of the tube 338 will now be positive and the plates of the right-hand sections of both tubes will be positive. Hence, the right-hand section of the tube 337 will conduct since the grid thereof will be positive due to its connection with the left-hand grid of the tube 338. Again, a voltage drop will be produced across the resistor 341 in the same direction as before. None of the other tube sections will be conductive since the plates of the left-hand sections of the tubes are negative and the grid of the right-hand section of tube 338 is negative. Hence, a full-wave rectified voltage will appear across the resistor 341, the upper end of the resistor being negative and the lower end positive.

Assume now that the phase of the voltage applied to the transformer 333 is just the reverse of that previously considered. Now, when the grid of the left-hand section of the tube 338 is positive the plate thereof will also be positive so that this section of the tube will conduct. Again, this will be the only tube section which is conductive since the plates of the right-hand sections are negative and the grid of the left-hand section of the tube 337 is negative. Hence, a voltage drop will be produced across the resistor 342, the cathode end of the resistor being positive and the plate end thereof negative.

During the next half cycle, the grid of the right-hand section of tube 338 will be positive as will also the plate thereof. Hence this section of the tube will conduct and cause a voltage drop to occur across the resistor 342 in such a direction that the cathode end of the resistor is positive and the plate end thereof is negative. None of the remaining sections of the tubes will conduct since the plates of the left-hand sections are negative and the grid of the right-hand section of tube 337 is negative. Thus, a full-wave rectified voltage will appear across one of the resistors 341 or 342 when the resultant voltage 330 is in phase with the reference voltage 178, and a similar voltage will appear across the other resistor when the resultant voltage 330 is 180° out of phase with the reference voltage. When the phase of the resultant voltage is such that a rectified voltage appears across the resistor 341, a voltage drop will be produced across the resistors 343 and 344, the upper end of the resistor 343 being negative and the lower end of the resistor 344 being positive. In other words, the upper end of the resistor 343 will be negative with respect to ground while the lower end of the resistor 344 will be positive with respect thereto. If the phase of the reference voltage is just the opposite, so that the rectified voltage appears across the resistor 342, then the upper end of the resistor 343 will be positive with respect to ground while the lower end of the resistor 344 will be negative with respect to ground.

The upper end of resistor 343 is connected to an output lead 345 and the bottom of the resistor 344 is connected to an output lead 346. From the foregoing description, it will be clear that the sign of the voltage appearing across the leads 345 and 346 will be dependent on the phase of the resultant voltage 330 with respect to the 400 cycle reference voltage.

Since zero bias is applied to the grids of the tubes 337 and 338, some current will flow through the tubes when their plates become positive even though no signal is applied to the grids thereof due to an "on line" condition of the trace 198. Thus, with no voltage on the grids of the tubes, if the plates of the right-hand sections are now driven positive, current will flow through both of these sections and through the resistors 341 and 342. However, since the direction of current flow through the resistors is in opposite directions, and since the currents are of equal value, the voltages appearing across the resistors will be equal and opposite so that the potential difference across the leads 345 and 346 will be zero. During the next half cycle, the voltage on the plates will be reversed so that the plates of the left-hand sections will now be positive and these sections will be rendered conductive. Here again, however, the voltage drops across the resistors will be equal and opposite so that there will be no effective potential difference across the output leads. When a signal is applied to the primary winding of transformer 333 due to departure of the center of the trace 198 from the pattern line, the current flow through the section of the tube whose grid is driven positive at the same time that the plate goes positive will be increased while the current flow through the corresponding section of the other tube whose plate is positive will be decreased due to the grid being driven negative by the signal from transformer 333. Hence, an unbalance will be produced across the output leads 345 and 346 which will become greater as the amplitude of the signal on the grids becomes greater.

From the foregoing it will be observed that when a signal is applied to the transformer 333 which is in phase with the 400 cycle reference voltage provided by the generator 158, a net potential difference will appear across the output leads 345 and 346 which is proportional to the amplitude of the signal voltage. When the signal delivered to the transformer 333 is 180° out of phase with the 400 cycle reference voltage, a net potential difference of opposite polarity will appear across the output leads and, again, this potential difference will be proportional to the amplitude of the signal voltage.

The output from the phase sensitive rectifier of Fig. 22 is supplied to the input terminals of a bridge power amplifier which may be of the type disclosed in Fig. 23. In this circuit, four power amplifier vacuum tubes 350, 351, 352 and 353 constitute the four ratio arms of the bridge and any unbalance of the bridge circuit will be indicated by a current flow through a coil 354, the direction of current flow corresponding to the direction of unbalance of the bridge. The bridge circuit is normally in balance since the impedance of tubes 351 and 353 is equal as is also the impedance of tubes 350 and 352. Therefore, there is no potential difference between the ends of the coil 354 and no current will flow therethrough. If, however, a potential difference appears between the leads 345 and 346, this impedance balance will be upset since the lead 345 is connected to the grid of tube 351 while the lead 346 is connected to the grid of tube 353. The plates of the tubes 351 and 353 are connected by resistors 355 and 356 with the cathodes of tubes 350 and 352, respectively. The plates of tubes 350 and 352 are both connected to the positive terminal of a power supply 357, the negative terminal of which is connected to both cathodes of the tubes 351 and 353. Two parallel paths of current flow are therefore provided between the positive and negative terminals of the power supply 357, one of these paths being through the tube 351, resistor 355 and tube 350; and the other being through the tube 353, resistor 356 and tube 352. The resistors 355 and 356 being of equal value, it will be seen that so long as the impedance of tube 351 is equal to the impedance of tube 353, and the impedance of tube 350 is equal to the impedance of tube 352, the voltage at junction 358 will be equal to the voltage at junction 359 so that no current will flow through the coil 354.

Negative bias is applied to the grids of tubes 351 and 353 by means of a voltage divider including a resistor 360 and a potentiometer 361 connected between the plate voltage supply lead and ground. The slider on the potentiometer 361 is connected with the cathodes of the tubes. In this way a positive potential of variable value may be applied to the cathodes of the tubes whereby a negative bias will be provided since the grids of the tubes are grounded through resistors 343 and 344 (Fig. 22). The screen grids of tubes 351 and 353 are connected with a voltage tap on the power supply 357 so that the screens are supplied with a source of steady positive potential. As shown, this potential is applied through a potentiometer 362 connected between the screens so that the bridge may be brought into balance by adjustment of the slider thereof. In the case of the tubes 350 and 352, the screen grids are shown connected to the plates of the tubes so that these two tubes will operate as triodes.

Assuming now that the center of the trace 198 is slightly to one side or the other of the pattern line so that a potential difference appears across the leads 345 and 346, and assuming further that this difference is such that the grid of tube 351 is rendered more positive while the grid of tube 353 is rendered more negative, then the voltage drop across tube 351 will be reduced, the voltage drop across resistor 355 will be increased due to increased flow of current through tube 351, the bias on tube 350 will be increased due to the increased voltage drop across resistor 355, and the voltage drop across tube 350 will be increased. Hence, the voltage of the junction point 358 will be reduced. On the other hand, the more negative voltage on the grid of tube 353 will increase the resistance of this tube thereby reducing the voltage drop across resistor 356. The bias on tube 352 will thereby be decreased so as to reduce the impedance of this tube. Hence, the voltage of junction 359 will be increased. A voltage drop will therefore occur across the coil 354 and current will flow from right to left through the coil. If, now, it be assumed that the potential difference across the leads 345 and 346 be such that the grid of tube 353 is rendered more positive while the grid of tube 351 is rendered more negative, then the change in impedance of the tubes will be reversed and the voltage of junction 358 will be increased while the voltage of junction 359 will be decreased. Therefore, current will flow through the coil 354 from left to right.

Disposed within the tracing head 44 (Fig. 2) is a control unit consisting of a transducer 364, a servo-valve 365 operated by the transducer, and the variable differential transformer 336 controlled by the valve so as to introduce feed-back into the circuit. As shown in Fig. 2, the transducer 364 comprises a loud-speaker type motor of the well-known electrodynamic type which includes a field coil 367 wound about a cylindrical core 368 which is bolted to an end plate 369. Also bolted to the end plate 369 is cylindrical casing 370 which supports an annular pole piece 371. Inasmuch as the core 368, end plate 369, casing 370 and pole piece 371 are all formed of ferromagnetic material, excitation of the coil 367 from a suitable source of direct current will cause a magnetic field to be developed in the circular gap existing between the core 368 and the pole piece 371. Disposed within this gap is the rim of an aluminum cup 372 which carries the coil 354 (Fig. 23) which functions in the same manner as the voice coil in an ordinary loud-speaker motor. The gap between the core 368 and the pole piece 371 is of sufficient width to permit the cup 372 with the coil 354 wound thereabout to move freely in the axial direction. Consequently, when current flows through the coil 354 in one direction, the cup will be urged in one direction, whereas when the current flow through the coil is reversed, the cup will be urged in the opposite direction.

The cup 372 is secured by means of an insulating coupling to the left-hand end of a valve plunger 373 which is slidable within body 374 of servo-valve 365. The plunger 373 is unbiased and, due to its balanced construction, will remain in any position to which it is moved by the transducer 364. Also, the plunger 373 is kept "alive," i. e., constantly vibrating at a high frequency and with a small amplitude by harmonic voltages appearing in the coil 354. The second harmonic, viz, 800 cycles per second, predominates and is chiefly responsible for the "jitter" introduced into the plunger. This high frequency vibration is desirable since it greatly reduces the static friction on the plunger and renders it more responsive to signals from the transducer.

Mounted in the right-hand end of the plunger 373 is a chuck 375 in which is secured a wire 376 which is connected at its opposite end to one of a pair of reeds 378 which support the armature 377 of the differential transformer for rectilinear movement. As shown in Fig. 2, when the plunger 373 of the servo-valve is centered, the armature 377 of the transformer 336 is likewise centered with respect to the poles thereof. However, when the plunger 373 is moved to either side of center, the armature 377 will likewise be moved from its neutral position thereby unbalancing the transformer.

Referring to Fig. 22 where the differential transformer 336 is diagrammatically illustrated, it will be seen that the primary winding 379 of the transformer is supplied with 400 cycle alternating current from the terminal 159 on the generator 158 by means of a potentiometer 380. The slider of the potentiometer is connected to one end of the primary winding 379, the other end of this winding being connected to ground as shown. The secondary windings 334 and 335 of the differential transformer are connected in phase opposition so that the voltage induced in one will be 180° out of phase with the voltage induced in the other. Consequently, when the armature 377 is in a centered position, equal and opposite voltages will be induced in the secondaries 334 and 335 which are connected in series with the primary winding of the transformer 333. However, when the plunger of the servo-valve 365 is moved out of its centered position in response to a signal received by the coil 354 of the transducer 364, the armature 377 of the differential transformer will be moved in a direction to increase the coupling between the primary winding 379 and that secondary winding which is 180° out of phase with the resultant voltage appearing across the condenser 324. The signal to the transformer 333 will thereby be balanced out and the current flow through the coil 354 of the transducer will be reduced to zero. As the trace 198 returns toward its "on line" condition, the amplitude of the resultant voltage across the condenser 324 will be reduced so that the bucking voltage from the differential transformer will predominate. This will produce a signal in the transformer 333 which will produce a current flowing in the opposite direction through the coil 354 so as to move the plunger 373 in the opposite direction and return the armature 377 toward its centered position.

To ensure that the bucking voltage produced by the variable differential transformer is exactly 180° out of phase with the signal voltage, the phase shifting circuit (Fig. 18) may be adjusted by manipulation of variable resistor 162 to shift the phase of the sweep voltages relative to the reference voltage 178 (Fig. 8) to whatever extent is necessary to compensate for any phase shift occurring in the circuits shown in Figs. 19 to 21, inclusive. In the herein illustrated embodiment of my apparatus, the phase shift circuit is adjusted for a 90° phase shift, plus or minus a small additional shift to compensate for various small phase shifts occurring in the electrical circuits.

The potentiometer 380 (Fig. 22) provides a sensitivity control for the apparatus, i. e., it determines the extent of movement of valve plunger 373 and armature 377 which is required to balance out the signal voltage delivered by lead 325 to transformer 333. As the slider of the potentiometer is moved toward the right as viewed in Fig. 22, the amplitude of the 400 cycle voltage supplied to the primary winding 379 will be increased thereby reducing the movement of the armature 377 necessary to produce a bucking voltage of given amplitude. Hence, for a signal voltage of given value from the mixing circuit (Fig. 21), a smaller movement of the valve plunger will be sufficient to cancel out the signal when the slider of the potentiometer is toward the right-hand end of the potentiometer winding than when it is toward the left-hand end thereof. This decreased movement of the valve plunger necessary to balance out the given value of signal voltage will cause less rapid operation of the steering mechanism to recenter the trace on the pattern line. Hence, the sensitivity of the control apparatus will be less with the slider set to the right-hand end of the potentiometer than with it set to the left-hand end thereof.

The manner in which the servo-valve 365 operates to bring about a centered condition of the trace 198 on the pattern line may be understood by referring to Fig. 3 which shows the hydraulic circuits of the machine. As here shown the center port 381 of the valve 365 is supplied with high pressure fluid which is delivered thereto by a pump 382 which draws oil from sump 81 through a suction line 383 and delivers it to a high pressure line 384. The pressure of the fluid delivered by the pump is maintained constant by a relief valve 385 which permits a portion of the fluid to return to the sump if the pressure exceeds a predetermined value. As shown in the drawing, high pressure fluid from the line 384 is delivered through a line 386 to a pressure control chamber 387 in the left-hand end of the blocking valve 92. Valve 92 is provided with a plunger 388 which has a tapered valve shoulder 389 cooperating with an exhaust port 390. This port is connected by a line 391 with the pressure port 381 of the servo-valve 365. This valve 365 is provided with the customary exhaust ports which are connected with the sump by return lines 392 and also with the usual fluid delivery lines 393 and 394 which are connected to ports 395 and 396, respectively, of the safety cut-out valve 88. The ports 395 and 396 are, in turn, connected by fluid delivery lines 397 and 398, respectively, with a reversible hydraulic motor 400. The safety cut-out valve 88 is provided with a control plunger 401 which is normally maintained in the position shown in Fig. 3. With the plunger in this position, the line 393 is communicatively connected with line 397 through by-pass line 403, and line 394 is connected with line 398 through the chamber 404 in the valve body. When the plunger 373 of the servo-valve is centered, the fluid pressure in lines 393 and 394 will be equal and the hydraulic turn motor 400 will remain at rest. When the plunger 373 is moved out of the centered position, however, the pressure in the lines 393 and 394 will be unbalanced and the motor 400 will rotate in one direction or another depending upon the direction of movement of the valve plunger.

The turn motor 400 drives a pinion gear 402 which meshes with the gear 227 (see also Fig. 4) which, as previously mentioned, drives the gear 109 on the tracer head spindle and the gear 139 on the scanning yoke of the cathode ray tube. The direction of rotation of these gears is such as to rotate the yoke and the eccentric 57 in the proper direction to recenter the trace 198 on the pattern line 154.

The blocker valve 92 is provided in the circuit to throttle the return flow of fluid from the feed cylinders 50 and 53 to an extend proportional to the speed of rotation of the hydraulic motor 400. Hence, when a sudden change in direction of the pattern line is indicated by rapid rotation of the motor 400, the feed rate of the machine tool is reduced so as to enable the tracer to accurately follow the abrupt change in direction of the pattern line at this point. Accordingly, when the motor 400 is stationary, the blocker valve permits free flow of return fluid therethrough so as to permit the table and tool support to operate at the feed rate determined by the setting of the dial 120 (Fig. 2). Upon rapid rotation of the hydraulic turn motor, the blocker valve drastically throttles the flow of return fluid from the feed cylinders thereby reducing the feed rate of the machine to practically zero.

The operation of this valve is as follows: When the motor 400 is at rest, the servo-valve 365 is centered and the back pressure in the line 391 is approximately equal to pump pressure. This pressure is communicated to the right-hand end of the plunger 388 through line 407 and check valve 408. The plunger is thereby moved to the left under the combined influence of this pressure and the force of a balancing spring 409 which overcome the pump pressure delivered to the left-hand end of the plunger through line 410. As the plunger moves to the left, port 411 will be uncovered thereby permitting fluid from the line 407 to enter the right-hand end of the valve through branch line 412. Left-hand movement of the plunger also uncovers port 91 and permits return oil to flow freely from return line 90 into sump line 413. Movement of the plunger 388 to the left will be limited by the throttling effect of shoulder 389 which will reduce the pressure in lines 391 and 407 until a condition of balance is reached in which the combined force of balancing spring 409 and fluid pressure in the right-hand end of the valve equals the pump pressure applied to the left-hand end of the plunger through line 410.

If now, a sudden change of direction occurs in the pattern line, the servo-valve 365 will be displaced either to the right or the left and fluid will flow through the motor and back to the sump through one of the return lines 392. Hence, a pressure drop will occur in the line 391 which drop will be communicated to the right-hand end of the valve through the line 407. Consequently, the balancing spring 409 will be overcome and the plunger will be moved to the right by the pump pressure supplied to the left-hand end of the plunger. Movement of the plunger to the right will cut off the port 411 and the tapered shoulder 414 will severely throttle the flow of fluid through the port 91 and into the sump line 413. Once the port 411 is cut-off, further communication between the line 407 and the right-hand end of the valve can only be had through a hydraulic resistance 415 since check valve 408 will be closed. Further movement of the plunger 388 to the right will thereby be cushioned and a gradual slowing of the work table and tool support will be effected. As soon as the trace is again centered on the pattern line, the plunger of the servo-valve 365 will again be centered and pressure will be built up in the line 391. This increased pressure will be communicated to the right-hand end of the valve through the line 407 and check valve 408 and consequently the valve plunger will be moved to the left to again open the port 91 and permit return oil to flow through the valve and into the sump through line 413. The rate of feed of the cutter relative to the work will thereby again be restored to the selected value determined by the setting of the dial 120.

*Fail-safe device*

In the embodiment of the invention herein illustrated, there is provided a device for stopping the feeding movement of the cutter relative to the work unless some portion of the trace 198 is on the pattern line 154. In other words, if, for any reason, the trace should lose the pattern line, the machine will immediately be brought to a stop and automatic operation cannot again be resumed until the trace has been guided back onto the pattern line. The restoration of the trace onto the pattern line may be effected by manually operable means as will hereinafter be described.

To effectively bring the machine to a halt in the event that the scanning device loses the pattern line, the safety cut-off valve 88 (Fig. 3) will operate automatically to prevent movement of the table 32 and the tool support 35, and operation of the turn motor 400. As shown in Fig. 3, the plunger 401 of the valve 88 is held in the position shown by a latch 420 which engages with a shoulder 419 on the plunger and prevents movement of the plunger to the left under the influence of a compression spring 421. This is the normal position of the plunger and automatic operation of the machine in the manner previously described will continue so long as the plunger remains in this position. The latch 420 is pivoted at 422 and is normally urged to disengaging position by a tension spring 423. The pull of the spring is normally overcome and the latch maintained in effective position, as shown, by a normally energized solenoid 424 whose plunger is connected by a link 425 with the latch 420. So long as the solenoid is maintained energized, the upward thrust provided by the plunger will be sufficient to overcome the tension of the spring 423.

As shown in Fig. 24, the solenoid 424 is provided with an operating coil 426 which, when energized, will maintain the plunger of the solenoid in its projected position. Energizing current for the coil 426 is provided by a pair of thyratron tubes 427 and 428 which may, as shown, be of the shield-grid type. The plates of the thyratrons are supplied with alternating voltage from the secondary winding of a transformer 429 which is designed for operation on 110 v., 60 cycle current. The coil 426 of the solenoid has one end thereof connected to a center tap on the secondary winding of the transformer while the other end of the coil is connected by a pair of normally-closed, series-connected switches 430 and 431 to ground. The cathodes of the tubes are grounded while the shield-grids thereof are supplied with a negative bias obtained from a suitable source of negative voltage. In the circuit shown in Fig. 24, this voltage is supplied from a low voltage winding 432 on the transformer 429 which is rectified by a full-wave, bridge-type rectifier 433 the output of which is filtered by an electrolytic condenser of large capacity connected between the output lead 434 and ground. The lead 434 is connected with the shield-grids of the thyratron tubes so as to supply a negative voltage thereto. This lead is also connected to ground through a potentiometer 435 the slider of which is connected through grid resistors 436 and 437 with the grids of the tubes 427 and 428, respectively. Hence, a negative bias will be applied to the grids and the amount of this bias may be suitably adjusted by manipulation of the slider of potentiometer 435. The grids of the tubes 427 and 428 are connected to an input lead 438 by means of suitable coupling condensers 439 and 440, respectively. Referring to Fig. 20, it will be seen that lead 438 is connected with the plate of the amplifying tube 256 which receives the negative A and B pulses from the phototube 153 and converts these pulses into positive pulses of increased magnitude. Hence, the positive A and B pulses will be delivered by the lead 438 to the control grids of thyratron tubes 427 and 428.

Since the plates of the tubes 427 and 428 are connected to the ends of the secondary winding of transformer 429, one plate will be positive when the other is negative and this condition will be reversed every 1/120 second. Since A and B pulses are being delivered to the grids of the tubes at the rate of one every 1/800 second, at least six positive pulses will be received by each grid during the positive swing of the plate thereof. The peak voltage of these pulses is sufficient to overcome the negative bias on the control grids and shield-grids of the thyratron tubes and so will cause that tube whose plate is positive to be rendered conductive. Hence, the tubes 427 and 428 will normally conduct during alternate half cycles of the 60 cycle current supplied to the transformer 429. The current from both tubes will flow in the same direction through the coil 426 thereby energizing the same and holding the latch 420 (Fig. 3) in its raised or latching position. If, however, for any reason the trace 198 should leave the pattern line completely so that no A or B pulses would be produced by the phototube, the thyratrons 427 and 428 will then not be triggered and the solenoid 424 will become deenergized thereby permitting the spring 423 to pull out the latch 420. The spring 421 (Fig. 3) acting on the plunger 401 of the safety cut-off valve will move the plunger to the left thereby closing off the port 89 so as to block the flow of return fluid from the cylinders 50 and 53 and stop the feed of the table 32 and the work support 35. At the same time, the left-hand spool on the plunger will open the port 395 with respect to the port 396 thereby short circuiting the lines 393, 394 and 397, 398. Operation of the turn motor 400 will thereby be prevented although the motor shaft will be free to rotate so that hand steering of the machine by hand wheel 108 will be possible. Movement of the plunger 401 to the left will also cause a contact disc 445 of normally closed switch 430 (see also Fig. 24) to be moved to the left thereby breaking the electrical circuit between contacts 446 and 447 thereof. The circuit through coil 426 of solenoid 424 is thereby broken so that the solenoid cannot again become energized until the plunger 401 is returned to the automatic control position illustrated in Fig. 3.

The safety cut-out valve 88 is mounted within the tracing head 44 with the left-hand end of the plunger (Fig. 3) projecting outward through the forward wall of the casing where it is provided with hand knob 448 (see also Fig. 1). The operator may thereby restore the valve plunger to its automatic control position by pushing inward on the knob 448. It will be noted that the right-hand spool of the plunger 401 is provided with a tapered shoulder 449 so as to permit a gradual resumption of the flow of fluid through the return lines 86 and 90. By virtue of this feature, it is possible for the operator to bring the machine back into operation and restore the trace to the pattern line by easing in the plunger 401 with one hand to a point where a slow feed of the cutter relative to the work is effected and then rotating hand wheel 108 with the other hand to steer the trace back onto the line.

The normally-closed push-button switch 431 (Fig. 24) serves as an emergency stop and may be placed in a readily accessible position on the front of the machine where it can be easily reached. By pressing in on the push-button, the switch 431 is opened thereby breaking the circuit through the coil 426 of the solenoid which releases the valve plunger 401 and stops the machine. The machine will then remain at rest until the plunger 401 is returned to right-hand position so as to reenable the machine feed, automatic steering by turn motor 400, and energization of solenoid 424 by closure of the plunger controlled switch 430.

*Pattern*

As mentioned earlier herein, in the embodiment of the invention disclosed in the present specification and drawings, the pattern 34 consists of a white pattern line 154 on a dark, non-reflecting background. If desired, however, the pattern may be formed of a dark, non-reflecting pattern line inscribed on a light reflecting surface. In this case, the pulses delivered by the phototube 153 to the amplifying tube 246 will be positive pulses in place of negative pulses so that it will be desirable to introduce another stage of amplification at this point to reverse the polarity of the pulses.

To enable the automatic line tracking device to satisfactorily negotiate extremely sharp corners in the pattern line 154 and to cause these corners to be reproduced with a high degree of accuracy, the pattern is provided with turn loops 450 which guide the scanning device around the loop and back onto the pattern outline in a smooth, even manner without introducing any sudden changes in direction which might cause the trace to lose the pattern line or adversely affect the accuracy of the reproduction of the pattern outline on the work piece.

All of the electronic equipment illustrated in Figs. 18 to 24, inclusive, with the exception of the cathode ray tube 130 and the phototube 153, may be housed in a control box 453 having a control panel 454 on which the various controls and indicating devices for facilitating proper adjustment and operation of the control apparatus are mounted. The necessary electrical connections between the electronic equipment in the box 453 and the associated equipment in the tracer head 44 are effected by means of a flexible cable 455 which permits movement of the head 44 relative to the stationary control box 453.

*Operation*

In the operation of the apparatus which has been heretofore described in conjunction with the accompanying drawings, the machine is set up with the work piece 33 and the pattern 34 secured to the longitudinally slidable work table 32. The head 44 is then adjusted on the tool support 35 so as to cause the longitudinal axis of the cathode ray tube and the rotational axis of the cutter 39 to lie in vertical alignment with corresponding points on the pattern 34 and work piece 33. The beam of the cathode ray tube is then biased away from the pattern line by a distance equal to the radius of the cutter 39. As heretofore explained, this adjustment of the beam may be effected by moving the pin 220 (Fig. 6) into that hole 221 which most nearly approaches the amount of deflection desired. Fine adjustment of the beam may then be secured by adjustment of the thumb screw 224. The desired amount of anticipation may be introduced by adjusting the thumb screw 216 (Fig. 6) to deflect the beam in the direction of travel thereof along the pattern line. The length of the trace 198 in the transverse direction may be varied by adjusting the T-pad 186 by a suitable control knob on the control panel 454. In a like manner, the amount of curvature introduced into the trace may be controlled by adjustment of the T-pad 195 (Fig. 18) which may be effected by a control knob on the panel 454. It is to be noted that the sensitivity of the line tracking device will be increased by shortening the length of the trace, for with a short trace a small deviation of the center of the line from the center of the trace produces a greater effect on the separation of the A and B pulses than with a longer trace. The introduction of curvature into the trace is desirable since it introduces a certain amount of anticipation into the control circuit and enables the trace to pass over intersecting pattern lines without interruption or stoppage of the machine.

After these various adjustments have been effected, the trace is guided onto the pattern line by pressing in on the handknob 448 (Fig. 1) of the safety cut-out valve plunger and steering the machine with the hand wheel 108. As the trace is moved onto the line, the handknob 448 is forced all the way in so as to close the switch 430 (Figs. 3 and 24) and cause the latch 420 to move in behind the shoulder 419 on the plunger 401 and hold the same in its automatic control position. This will set the machine into automatic operation and cause the trace 198 to move in the direction of the arrow 456 (Fig. 7) around the pattern line 154. The cutter 39 will, at the same time, be moved in the direction of the arrow 457 (Fig. 7) and will machine the edge of the work piece 33 to the outline represented by the pattern line. When the trace 198 is in the position shown in Fig. 7 and moving toward the right along the pattern line, the upward curvature in the pattern line at this point will result in the center of the trace 198 moving to the right side of the line. This will alter the phase relationship of the A and B pulses and cause a resultant voltage to appear across the condenser 324 (Fig. 21). The amplitude of this voltage will depend upon the extent of deviation of the center of the trace from the pattern line, while the phase thereof will be the same as that of the 400 cycle reference voltage (see Figs. 8 and 15c). This signal voltage will be rectified in the phase sensitive rectifier shown in Fig. 22 and cause an unbalance in the bridge circuit shown in Fig. 23. This will cause current to flow through the coil 354 of the transducer 364 (Fig. 2) thereby moving plunger 373 of servo-valve 365 in such a direction as to cause the turn motor 400 to rotate the eccentric 57 in the proper direction to steer the center of the trace back onto the pattern line and also to rotate the scanning yoke 137 which tends to bring the center of the trace back on the line due to the eccentricity set in by thumb screw 216. At the same time, the armature 377 (Figs. 2 and 22) of the variable differential transformer 336 will be decentered and cause a bucking voltage to oppose the signal voltage appearing across the condenser 324. The armature 377 will move until it has produced a bucking voltage which equals the signal voltage. The armature will then stop since the signal will be canceled out in the primary winding of the transformer 333 and the bridge will again become balanced so that no current will flow through the coil 354 (Fig. 2). As the center of the trace is returned toward the pattern line, the plunger of the valve 365 will be returned toward its centered position since the bucking voltage produced by the transformer 336 will now exceed the signal voltage and cause reverse current flow through the coil 354. As soon as the trace is centered on the pattern line, the plunger of the servo-valve 365 will again be centered and will remain there until a change in direction of the pattern line again causes it to move to one side of the center of the trace 198 whereupon a corrective signal will again be supplied tending to restore the trace and again center it on the pattern line.

Referring to Fig. 7, the trace 198 will continue to follow the pattern line 154 in this manner, the rate of travel of the trace 198 along the pattern line and the speed of the cutter 39 in relation to the work 33 depending upon the setting of the dial 120 (Fig. 2) which determines the amount of eccentricity of the cams 100 and 101 and thereby the feed rate of the machine. When the trace reaches the corner 460 (Fig. 7) it will encounter the cross-over line 461 of the turn loop 450. Here the trace will continue traveling to the right and will follow around the loop 450 in a counter-clockwise direction. When it reaches the corner 460 it will again pick up the pattern line and will follow it down toward a fillet 462. In this way the cutter will be caused to cut a sharp, right angled corner on the workpiece.

In passing cross-over lines, such as the line 461, contrary turn signals will be produced by the outer tips of the trace 198 as they cross the line. These signals, however, will cancel one another and will be ineffective to displace the plunger 373 (Fig. 2) of the servo-valve 365 so that the trace will continue to follow the pattern line 154.

When the trace reaches the fillet 462, the sharp turn encountered at this point will cause a larger than normal displacement of the plunger 373 of the servo-valve to occur thereby sharply reducing the pressure in the line 391 (Fig. 3). This will cause the plunger 388 of the blocker valve 92 to move to the right and throttle the flow of fluid through the return lines 90 and 86. The table 32 and tool support 35 will thereby be brought virtually to a standstill until the turn motor 400 has had an opportunity to return the center of the trace onto the pattern line. The plunger of the servo-valve will then again be centered and the blocker valve plunger will be restored to its normal position as shown in Fig. 3 and will permit resumption of normal feeding movement of the table and tool support. The trace will now follow along the pattern line to the corner 463 where again a sudden change in direction will cause operation of the blocker valve 92 to reduce the feed rate and permit the cutter to accurately reproduce in the work piece 33 the shape of the pattern at this point. The trace will then follow the pattern line to the corner 464 where it will continue across the cross-over line and proceed counter-clockwise around the turn loop 450 and again pick up the pattern line 154 at the corner 464. The machine will continue to follow the outline of the pattern represented by the pattern line 154 in this manner until it has traveled completely around the pattern line and reached the starting point. The operator of the machine may now press the stop button 431 (Fig. 24) to thereby disengage the latch 420 (Fig. 3) and release the plunger 401 of the safety cut-off valve 88. The return flow of fluid through the lines 86 and 90 being cut off, the machine will be stopped and the cutter may be steered by hand away from the work piece 33. A fresh piece of work may now be affixed to the table 32, the trace 198 again steered onto the pattern line 154 by combined manipulation of the handknob 448 and the hand wheel 108 after which the handknob may be forced all the way in to reengage the latch 420 with the shoulder 419 on the plunger 401. Automatic operation of the machine will be resumed and the trace 198 will continue to follow the pattern line 154 until the machine is again stopped by the operator.

Although I have described my method and apparatus for reproducing pattern outlines in connection with one particular embodiment thereof and, therefore, have used certain specific terms and language herein, it is to be understood that the present disclosure is illustrative rather than restrictive and that changes and modifications may be resorted to without departing from the spirit and scope of the claims which follow.

Having thus described my invention, what I claim as new and useful and desire to secure by United States Letters Patent, is:

1. An apparatus for automatically reproducing the shape of a line on a pattern comprising a cathode ray tube, means for causing the electron beam of said tube to be swept back and forth along a predetermined path to form a moving light spot on the screen of said tube, means for projecting the image of the light spot on said pattern, power operated means for effecting relative movement between said cathode ray tube and said pattern, light-sensitive means for producing an electrical impulse each time the image crosses the line, and means controlled by the phase relationship of said impulses for controlling said power operated means to keep the path of the image centered on the line.

2. The apparatus of claim 1 including magnetic means for applying a fixed bias to the electron beam of said cathode ray tube so as to enable the light spot to be offset from the center of the screen of said tube.

3. The apparatus of claim 2 wherein said magnetic means includes a pair of biasing magnets arranged with their fields in quadrature so as to enable offsetting of the light spot in two mutually perpendicular directions from the center of the screen.

4. The apparatus of claim 1 including manually adjustable means for controlling the curvature of the path of the light spot on the screen of said tube.

5. The apparatus of claim 1 including means for adjusting the sensitivity of said controlled means to deviations of the center of the trace formed by the moving image from the line being followed.

6. The apparatus of claim 5 wherein said adjusting means includes a manipulative device for varying the transverse length of the trace formed by the moving image of the light spot on the screen of said tube.

7. The apparatus of claim 6 wherein said adjusting means includes a second manipulative device for introducing varying amounts of curvature into the trace of the light spot on the screen of said tube.

8. An apparatus for automatically reproducing the shape of a line on a pattern comprising a cathode ray tube, means for causing the electron beam of said tube to be swept back and forth along a predetermined path to form a moving light spot on the screen of said tube, means for projecting the image of the light spot on said pattern, a work piece, a rotary cutter for contouring said work piece, power operated means for effecting relative movement between said cathode ray tube and said pattern and between said cutter and said work piece, light-sensitive means for producing an electrical impulse each time the image crosses the pattern line, means controlled by the phase relationship of said impulses for controlling said power operated means to keep the path of the image centered on the line, and means for applying a predetermined radial bias to the electron beam of said tube so as to offset the light spot from the center of the screen by a distance equal to the radius of said cutter.

9. The apparatus of claim 8 wherein said bias applying means includes a permanent magnet arranged adjacent the neck of said tube.

10. An apparatus for automatically reproducing the shape of a line on a pattern comprising a cathode ray tube, means, including a pair of deflection coils mounted for rotation about the neck of said tube, for causing the electron beam of said tube to be oscillated back and forth along a predetermined path to form a moving light spot on the screen of said tube, means for projecting the image of said light spot on the pattern, power operated means for effecting relative movement between said cathode ray tube and said pattern, adjustable means for controlling said power operated means to determine the direction of relative movement between said cathode ray tube and said pattern, light-sensitive means for producing an electrical impulse each time the image crosses the line, means controlled by the phase relationship of said impulses for adjusting said direction determining means to keep the center of oscillation of the image centered on the line, and means connecting said direction determining means with said coils to automatically maintain the sweep axes of the coils properly oriented with respect to the line on the pattern.

11. The apparatus of claim 10 including a pair of biasing magnets arranged with their fields in quadrature and mounted to move in unison with said deflection coils when the latter are rotated around the neck of said tube by said direction determining means.

12. The apparatus of claim 10 including means moving in unison with said deflection coils as the latter are rotated around the neck of said tube by said direction determining means for applying a bias to the beam of said tube which is fixed with respect to the sweep axes of said coils.

13. The apparatus of claim 12 including means for adjusting the amount of bias applied to the electron beam of said tube.

14. In a line tracking device, the combination of an alternating current source; a pattern containing the line to be tracked; a scanning device including means for projecting a beam of radiant energy on said pattern, means for causing the beam to be oscillated at the frequency of the alternating current source, means for varying the direction of sweep of the beam relative to said pattern, and cooperating means for producing an electrical impulse each time the beam crosses the line on said pattern; means for comparing the phase relationship of said impulses with one another and with the alternating current from said source to determine the on-line or off-line condition of the center of oscillation of the beam; power operated means for moving said scanning device relative to said pattern; a direction control device for controlling said power operated means and said varying means to determine the direction of relative movement between said scanning device and said pattern and the direction of sweep of the beam relative to said pattern; and means controlled by said comparing means for adjusting said direction control device to cause the center of oscillation of the beam to follow the line on said pattern and to maintain the direction of travel of the beam perpendicular to the line at the point of crossing thereof.

15. In a line tracking device, the combination of an alternating current source; a pattern containing the line to be tracked; a scanning device including means for projecting a beam of radiant energy on said pattern, means for causing the beam to be oscillated at the frqeuency of the alternating current source, and cooperating means for producing an electrical impulse each time the beam crosses the line on the pattern; means for separating the impulses produced on the forward sweep of the beam from those produced on the return sweep thereof so as to form two trains of impulses; a separate circuit for shaping each train of impulses into a sine-wave voltage; means for mixing the two voltages and comparing the phase of the resultant voltage with that of the alternating current source to provide a control voltage; power operated means for causing relative movement of said scanning device and said pattern; a direction control device for controlling said power operated means to determine the direction of relative movement between said scanning device and said pattern; and means energized by said control voltage for adjusting said direction control device to cause the center of oscillation of the beam to follow the line on said pattern.

16. An automatic line following device comprising a scanner for following the line, a power operated means for causing relative movement of said scanner and the line, means for controlling said power operated means to determine the direction of relative movement between said scanner and the line, means for producing an electrical signal whenever said scanner moves to one side or the other of the line, the magnitude of the signal produced being proportional to the extent of deviation of said scanner from the line, means, including an element displaceable in accordance with the magnitude of the signal, for adjusting said direction determining means at a rate proportional to the magnitude of the signal, and means moving with said element for canceling out the signal to thereby cause the scanner to be brought back on the line at a rate proportional to the deviation thereof from the line.

17. In a line tracking device, the combination of an alternating current voltage source; a pattern containing the line to be tracked; a scanning device including means for projecting a beam of radiant energy on said pattern, means for causing the beam to be oscillated at the frequency of the alternating current source, and cooperating means for producing an electrical impulse each time the beam crosses the line on the pattern; means for separating the impulses produced on the forward sweep of the beam from those produced on the return sweep thereof; means for shaping the two sets of impulses into two sine-wave voltages; means for mixing the two voltages to obtain a resultant signal voltage having a magnitude proportional to the deviation of the center of oscillation of the beam from the line being followed; power operated means for causing relative movement of said scanning device and said pattern; means for controlling said power operated means to determine the direction of relative movement of said scanning device with respect to said pattern; means, including an element displaceable in accordance with the magnitude of the signal voltage, for adjusting said direction determining means at a rate proportional to the magnitude of the signal voltage; and means actuated by said element for producing a bucking voltage of a value proportional to the displacement of said element for canceling out the signal voltage thereby causing the center of oscillation of the beam to be brought back on the line at a rate proportional to the extent of the deviation thereof from the line.

18. The line tracking device of claim 17 wherein said voltage producing means includes a variable differential transformer energized from said alternating current voltage source.

19. A pattern line controlled machine comprising transversely movable supports for effecting universal relative movement between a tool and a work piece; power operated means for moving said supports; a pattern containing the line to be tracked; a scanner for following the line on said pattern, said scanner including means for oscillating a beam of radiant energy back and forth across the line on said pattern, rotatable means for determining the direction of sweep of the beam, and means for producing an electrical impulse each time the beam crosses the line; means for mounting said pattern on one of said supports and said scanner on the other of said supports and said scanner on the other of said supports; means for determining the direction of relative movement of said scanner and said pattern, said means including an eccentric and devices actuated thereby for controlling said power operated means; means controlled by the phase relationship of said impulses for rotating said eccentric in one direction or the other to maintain the center of oscillation of the beam on the line; and a gear drive between said rotatable means and said eccentric rotating means for maintaining the sweep of the beam oriented with respect to the line.

20. A control apparatus for automatically following a pattern line comprising a scanning device for continuously sweeping a beam of radiant energy back and forth across the pattern line, power operated means for effecting relative movement between said scanning device and the pattern line, means for producing an electrical impulse each time the beam crosses the pattern line, means for disabling said power operated means, and means rendered effective by the impulses for preventing operation of said disabling means.

21. The control apparatus of claim 20 wherein said preventing means includes a solenoid and means controlled by the impulses for energizing the solenoid to prevent operation of said disabling means.

22. The control apparatus of claim 21 in which said last-mentioned means includes a thyratron tube.

23. An apparatus for automatically reproducing the shape of a pattern line comprising a device for following the line, means for generating a series of electrical impulses all the while the device is on the line, power operated means for effecting relative movement between said scanning device and the pattern line, and means for disabling said power operated means whenever said device leaves the line, said means including an element movable from an ineffective position to an effective position, and means controlled by the impulses for preventing movement of said element as long as the device is on the line and impulses are being produced by said generating means.

24. In an apparatus for automatically following a line on a pattern, said apparatus having a scanning device for sweeping a beam of radiant energy back and forth across the pattern and for producing a signal whenever the beam crosses the pattern line, a power means for effecting movement of the scanning device relative to the pattern, and a means responsive to the signals produced by the scanning device for controlling the power means to cause the scanning device to follow the line on the pattern, the combination of means for enabling said scanning device to execute a sharp external corner on said pattern line without reducing the rate of movement of the scanner relative to the pattern comprising a turn loop on said pattern having a substantially circular line appended to the pattern line at said external corner and having entrance and exit portions which extend in the same general direction as the portions of the pattern line lying adjacent the corner on either side thereof.

25. A machine for reproducing in a workpiece the shape of a line on a pattern, comprising a cutter, means for producing a voltage having a sign and magnitude corresponding to the direction and extent of deviation of the cutter from the outline represented by the pattern line, and means controlled by said voltage for returning the cutter to the pattern outline, said means including a valve having a plunger movable in either of two directions for controlling the direction of movement of said cutter relative to the workpiece, and a moving-coil magnetic motor controlled by said voltage for moving said plunger in one direction or the other by an amount proportional to the extent of deviation of the cutter from the pattern outline.

26. The machine of claim 25 in which means is provided for applying to said coil a voltage having a magnitude substantially proportional to the displacement of said plunger from a neutral position and a sign opposite to that of the control voltage.

27. The machine of claim 26 wherein said voltage applying means includes a variable differential transformer controlled by movement of said plunger.

28. An apparatus for automatically reproducing the shape of a line on a pattern comprising a cathode ray tube, means for causing the electron beam of said tube to be swept back and forth along a predetermined path to form a moving light spot on the screen of said tube, means for projecting the image of the light spot on said pattern, light-sensitive means for producing an electrical impulse each time the image crosses the pattern line, and means controlled by said electrical impulses for effecting relative movement between said cathode ray tube and said pattern.

29. A device for automatically following a pattern line comprising a cathode ray tube for sweeping a beam of light back and forth across the pattern line, means for supporting said tube for translatory movement relative to said pattern, a deflection yoke supported for rotation about the neck of said tube, and means for turning said yoke to maintain the beam sweep properly oriented with respect to the pattern line.

30. A device for automatically following a pattern line comprising a cathode ray tube for sweeping a beam of light back and forth across the pattern line, means for supporting said tube for translatory movement relative to said pattern, a deflection yoke supported for rotation about the neck of said tube, and means for turning said yoke to maintain the beam sweep properly oriented with respect to the pattern line, including means for producing an error signal whenever the center of said beam sweep departs from the line being followed, and means operating in response to said signal to turn said yoke to maintain the beam sweep transverse to the pattern line.

31. A control apparatus for automatically following a pattern line comprising an electronic scanning device for oscillating a beam of radiant energy back and forth across the pattern line, said device including a cathode ray tube and deflection coils rotatably mounted on the neck of said tube so as to enable the sweep of the beam to be oriented with respect to the pattern line, power operated means for effecting relative movement between said scanning device and the pattern line, positionable means for controlling the power operated means to determine the direction of relative movement between said device and the pattern line, means for producing an electrical impulse each time the beam crosses the pattern line, means controlled by the phase relationship of said impulses for positioning said direction determining means to maintain the center of oscillation of the beam on the pattern line as said scanning device moves therealong, and a driving connection between said direction determining means and said coils to automatically maintain the sweep axes of the coils properly oriented with respect to the pattern line being followed.

References Cited in the file of this patent

UNITED STATES PATENTS

| | | |
|---|---|---|
| 1,943,109 | Collidge | Jan. 9, 1934 |
| 2,331,337 | Meyer | Oct. 12, 1943 |
| 2,457,456 | Flory | Dec. 28, 1948 |
| 2,489,305 | McLennan | Nov. 29, 1949 |
| 2,499,178 | Berry et al. | Feb. 28, 1950 |
| 2,522,872 | Heppner | Sept. 19, 1950 |
| 2,548,590 | Cook | Apr. 10, 1951 |
| 2,645,971 | Herbst | July 21, 1953 |
| 2,671,129 | Moore | Mar. 2, 1954 |
| 2,691,743 | Urtel | Oct. 12, 1954 |
| 2,701,850 | Blayney | Feb. 8, 1955 |